(12) United States Patent
Mosterman et al.

(10) Patent No.: US 10,817,628 B1
(45) Date of Patent: Oct. 27, 2020

(54) SYSTEM AND METHOD FOR GRAPHICAL MODEL PROCESSING

(75) Inventors: Pieter J. Mosterman, Framingham, MA (US); Robert O. Aberg, South Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 1185 days.

(21) Appl. No.: 13/180,365

(22) Filed: Jul. 11, 2011

Related U.S. Application Data

(63) Continuation-in-part of application No. 11/129,000, filed on May 13, 2005, now Pat. No. 7,979,243.

(51) Int. Cl.
*G06F 30/20* (2020.01)
*G06F 8/34* (2018.01)
*G06F 30/15* (2020.01)
*G06F 111/12* (2020.01)

(52) U.S. Cl.
CPC .............. *G06F 30/20* (2020.01); *G06F 8/34* (2013.01); *G06F 30/15* (2020.01); *G06F 2111/12* (2020.01)

(58) Field of Classification Search
None
See application file for complete search history.

(56) References Cited

U.S. PATENT DOCUMENTS

| | | | |
|---|---|---|---|
| 4,604,718 A | 8/1986 | Norman et al. | |
| 5,157,778 A | 10/1992 | Bischoff et al. | |
| 5,247,650 A | 9/1993 | Judd et al. | |
| 5,701,439 A * | 12/1997 | James et al. | 703/17 |
| 5,926,403 A | 7/1999 | Ho et al. | |
| 6,125,207 A * | 9/2000 | Merchant | G08B 5/226 358/426.04 |
| 6,425,762 B1 | 7/2002 | Ernst | |
| 6,944,584 B1 | 9/2005 | Tenney et al. | |
| 7,124,071 B2 | 10/2006 | Rich et al. | |
| 7,178,112 B1 | 2/2007 | Ciolfi et al. | |

(Continued)

OTHER PUBLICATIONS

Otter et al., Modelica, Language, Libraries, Tools, and Conferences, Apr. 2002, pp. 1-12.*

(Continued)

*Primary Examiner* — Omar F Fernandez Rivas
*Assistant Examiner* — Bernard E Cothran
(74) *Attorney, Agent, or Firm* — Cesari and McKenna, LLP

(57) ABSTRACT

In a graphical modeling environment supporting a model having at least two different analysis frameworks operating therein, a system and corresponding method of processing the graphical model modify the model to group model portions together for processing in the same analysis framework. Model parts are identified and associated with the analysis framework in which they operate. Model parts are then grouped based on their association with their analysis framework to form model portions that operate in one of the different analysis frameworks, In instances where topological separation of model portions operating in the same analysis framework occurs, the system and method reconfigure intervening model portions to be amenable with operation in the analysis framework of the surrounding model portions to improve processing efficiency.

39 Claims, 15 Drawing Sheets

(56) References Cited

U.S. PATENT DOCUMENTS

| | | | |
|---|---|---|---|
| 7,324,931 | B1 | 1/2008 | Warlock |
| 7,487,080 | B1 | 2/2009 | Tocci et al. |
| 7,680,637 | B1 | 3/2010 | Wolodkin |
| 7,739,081 | B1 | 6/2010 | Kierzenka et al. |
| 7,765,529 | B1* | 7/2010 | Singh ............... G06F 8/34 717/134 |
| 2003/0154451 | A1 | 8/2003 | Rassaian |
| 2003/0195726 | A1 | 10/2003 | Kondo |
| 2003/0204564 | A1* | 10/2003 | Keene .................. 709/203 |
| 2004/0210426 | A1 | 10/2004 | Wood |
| 2004/0210429 | A1 | 10/2004 | Yu et al. |
| 2004/0215441 | A1* | 10/2004 | Orofino, II .......... G06F 8/10 703/22 |
| 2005/0216248 | A1 | 9/2005 | Ciolfi et al. |
| 2006/0064670 | A1 | 3/2006 | Linebarger et al. |
| 2006/0110043 | A1* | 5/2006 | Reissman ............ 382/203 |
| 2006/0282248 | A1 | 12/2006 | Kageyama et al. |
| 2009/0012754 | A1 | 1/2009 | Mosterman et al. |

OTHER PUBLICATIONS

Levitan et al., System Simulation of Mixed-Signal Multi-Domain Microsystems With Piecewise Linear Models, Feb. 2003, IEEE, vol. 22 No. 2, pp. 139-154.*

Techopedia, Polymorphism, 2016, Techopedia, pp. 1-2.*

Dictionary.com, Definition of boundary, 2017, Dictionary.com, pp. 1-4.*

"SimMechanics: User's Guide Version 2," The MathWorks, Inc., Mar. 2005, pp. i to x, 1-1 to 1-26, 2-1 to 2-58, 3-1 to 3-24, 4-1 to 4-76, 5-1 to 5-34, 6-1 to 6-38, 7-1 to 7-47, 8-1 to 8-40, 9-1 to 9-216, 10-1 to 10-10, A-1 to A-4, B-1 to B-2, Glossary-1 to Glossary-20, and Index-1 to Index-6.

"SimDriveline: User's Guide Version 1," The MathWorks, Inc., Mar. 2005, pp. i to iv, 1-1 to 1-22, 2-1 to 2-64, 3-1 to 3-28, 4-1 to 4-6, 5-1 to 5-90, A-1 to A-4, B-1 to B-2, and Index-1 to Index-2.

Mosterman, Peter J., "An Overview of Hybrid Simulation Phenomena and Their Support by Simulation Packages," Lecture Notes in Computer Science, vol. 1569, Proceedings of the Second International Workshop on Hybrid Systems: Computation and Control, 1999, pp. 1-10.

Otter, Martin, et al., "Hybrid Models of Physical Systems and Discrete Controllers," at—Automatisierungstechnik, vol. 48, No. 9, Sep. 2000, pp. 1-12.

Denckla, Ben, et al., "Formalizing Causal Block Diagrams for Modeling a Class of Hybrid Dynamic Systems," 44$^{th}$ IEEE Conference on Decision and Control, Seville, Spain, Dec. 12-15, 2005, pp. 1-6.

Mosterman, Peter J., et al., "Computer Automated Multi-Paradigm Modeling in Control System Design," Proceedings of the IEEE International Symposium on Computer-Aided Control System Design (CACSD00), Anchorage Hilton, Anchorage, Alaska, USA, Sep. 25-27, 2000, pp. 1-6.

Mosterman, Peter J., et al., "An Introduction to Computer Automated Multi-Paradigm Modeling," Simulation: Transactions of the Society for Modeling and Simulation International, vol. 80, No. 9, Editor Choice Article, May 26, 2004, pp. 1-16.

Levitan et al. "Systems Simulation of Mixed-Signal Multi-Domain Microsystems with Piecewise Linear Models": IEEE Transactions on Computer-Aided Design of Integrated Circuits and Systems—vol. 22, No. 2, Feb. 2003.

Engelson et al. "A Design, Simulation, and Visualization Environment for Object-Oriented Mechanical and Multi-Domain Models in Modelica", Jul. 1999.

Griffith et al. "Mixed Frequency/Time Domain Analysis of Nonlinear Circuits", IEEE Transactions on Computer-Aided Design, vol. 11, No. 8, Aug. 1992.

Martinez et al. "Mixed-Technology System-Level Simulation", Analog Integrated Circuits and Signal Processing, 29, 127-149, 2001.

Fritzson et al. "An Integrated Modelica Environment for Modeling, Documentation, and Simulation", Proceedings of the 1998 Summer Computer Simulation Conference (SCSC '98) Jul. 19-22, 1998.

Cubert et al. "MOOSE: An Object-Oriented Multimodeling and Simulation Application Framework", 1997.

Buck et al. "Ptolemy: A Framework for Simulating and Prototyping Heterogenous Systems", Aug. 1992.

Devarajan et al. "Multi-Domain Modeling and Simulation of a Linear Actuation System", 2003.

El-khoury et al. "Towards a Toolset for Architectural Design of Distributed Real-Time Control Systems", IEEE 2001.

The MathWorks, Inc. "SimMechanics, for use with Simulink" User's Guide, Version 2, 2001; 4:1-7.

* cited by examiner

SYSTEM AND METHOD FOR GRAPHICAL MODEL PROCESSING

CROSS-REFERENCE TO RELATED APPLICATIONS

The present application is a continuation-in-part of commonly assigned co-pending U.S. patent application Ser. No. 11/129,000, filed on May 13, 2005, by Pieter J. Mosterman and Robert O. Aberg for a SYSTEM AND METHOD FOR GRAPHICAL MODEL PROCESSING, which is hereby incorporated by reference in its entirety.

FIELD OF THE INVENTION

The present invention relates to a system and method for processing models, and more particularly to a system and method for efficiently handling graphical models that contain parts that are modeled using different, domain-specific, analysis frameworks.

BACKGROUND OF THE INVENTION

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical and physics systems. The models and results are often used as a scientific communication medium between humans. The term "model-based design" is used to refer to the use of graphical models in the development, analysis, and validation of dynamic systems, and can additionally include development, analysis, and validation of static systems, parametric systems, probabilistic systems, and the like.

Dynamic systems are typically modeled in simulation environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

Various classes of graphical models describe computations that can be performed on computational hardware, such as a computer, microcontroller, FPGA, and custom hardware. Generally, graphical analysis and simulation methods, such as the block diagram method, are used in modeling for design, analysis, and synthesis of engineered systems. The visual representation allows for a convenient interpretation of model components and structure and provides a quick intuitive notion of system behavior. Modeling is the process of abstracting away aspects of reality to arrive at a formal representation of the system characteristics that are pertinent to solving a problem. For example, in case the step response of a system is to be optimized, a model can be designed that captures the dynamics of the system. If, however, the layout of components of the same system needs to be determined, a model that captures the geometries of the components involved can be effectively applied. The dynamic model would be inappropriate for the latter task.

Given the many different problems that need to be addressed in system design, a multitude of models is typically used. Each of these models may address very specific characteristics, and, as such, it is desirable to have a dedicated language available to represent the model.

For example, consider modeling the dynamics of a controlled system. On many occasions, these are modeled using differential equations. Therefore, a suitable language, or analysis framework, to be used could be time-based block diagrams such as found in Simulink®. Those time-based block diagrams are of little use to model the geometries, which is better addressed by using Computer-Aided Design (CAD) tools such as SolidWorks® by SolidWorks Corporation of Concord, Mass.

Similarly, dedicated analysis frameworks each having dedicated algorithms are desired for modeling, for example, electrical circuits, multi-body systems, driveline systems, hydraulic systems, reactive control systems, closed loop control systems, and software systems. To facilitate the convenience of such high-level and dedicated analysis frameworks requires sophisticated technology that translates the model into a representation that can be used by an execution engine. This translation can proceed by generating an executable representation that in one step or several steps can move the original high-level model through a number of intermediate representations before arriving at an executable representation.

By analysis framework, what is meant generally is a structure for processing a portion or all of a model to obtain a result. Analysis frameworks can be broadly defined by the particular dedicated algorithms that are used during the processing step, such that model components requiring different dedicated algorithms to be processed would be classified as operating in different analysis frameworks. It should be noted, however, that components of a model requiring dedicated algorithms that differ only insubstantially may be classified as operating in a same analysis framework, such that minor algorithm differences may not be definitive of different analysis frameworks. Additionally, analysis frameworks can include both graphical and non-graphical model environments.

An important distinction between analysis frameworks is whether they apply to causal or non-causal models or model portions. In this context, causal model portions are those for which all entities in the model portion have fixed input and output variables. Non-causal model portions include entities that have interface variables that may be input and output. Whether such interface variables are considered input or output is inferred by analysis of the computational dependencies in the model portion and not a priori determined by the model designer.

For example, in an electrical circuit model portion, an entity may be an electrical resistor. This resistor has two ports (one defined to be at the positive electrical potential and one at the negative electrical potential) across which energy can be exchanged with other electrical components. These two ports have two interface variables each, the electrical potential and the electrical current. It is not known a priori whether the current is computed based on the potential difference or whether the current is computed based on the voltage difference. This depends on whether the electrical resistor is driven by a voltage or a current, and this computational causality can be inferred once the computational dependencies of the model portion are known.

In many cases, two or more dedicated analysis frameworks are required in a single model to address different, but interacting, aspects of the system. In such an instance, it is desirable to ultimately translate the different model parts into a common representation that is shared by all different analysis frameworks involved. For example, in the instance where a multi-body specific analysis framework is used alongside a differential equation analysis framework in the same model, the multi-body model part can first be translated into a differential equation representation. After this, the entire model is described in terms of differential equations and the common representation can now be mapped onto an executable form, which could be, for example, the compiled data structure as employed by Simulink®.

Looking at FIG. 1, a user 80 in this example designs a model that contains a multi-body system modeled using the SimMechanics™ modeling application and a differential equation system that is modeled using block diagrams. The SimMechanics™ model part 81 is first translated into a block diagram representation 83 that can then be combined with a user designed block diagram representation 82 of the remainder of the model. The combined block diagram model is then translated into the Simulink® compiled representation 84 to be used for execution.

This example is illustrative of the use of separate translation stages. To implement the strategy illustrated in the figure, it is necessary to arrive at a common representation for all the different analysis frameworks present in the model and to eventually translate the common representation into an executable form.

A first known strategy for reducing the model to executable form is to generate the common representations as early as possible in the model processing as illustrated in FIG. 2. Generic algorithms are then applied to produce an executable representation from the common representation. In FIG. 2, the model contains a block diagram 85 and multi-body mechanical model part 86. A common representation 87 is first established in the form of a set of equations to combine the block diagram and mechanical analysis parts. Once both the block diagram and mechanical analysis parts are translated into equation sets, generic equation processing technology is applied to sort the equations into executable form 88. Once sorted, a final translation produces equivalent computer code 89 that is executed independently or by a simulation environment to solve the equations and return model results.

A second known strategy for reducing the model to executable form is to use dedicated algorithms can be used for each of the different model parts to produce an optimized common representation. This common representation may then be in a more processed state than in the alternative approach. In FIG. 3, a multi-body mechanical analysis part 90 is immediately translated into sorted equations 91. Because the equation processing is now limited to the multi-body domain, dedicated algorithms can be applied to arrive at a very efficient representation in terms of sorted equations. Next, these equations are translated into a block diagram model 92 that can be integrated with a block diagram model 93 as designed by the user. The combined block diagrams are then translated into a compiled form 94 that a software application such as Simulink® can execute to achieve model results.

In the second approach, as shown in FIG. 3, there is a need for a mechanism to designate the part of the model that needs to be processed in a dedicated manner. State of the art tools such as Simulink® employ demarcating blocks such as "sensors" and "actuators" to this end. The sensor and actuator blocks are types of demarcating blocks that represent the boundary between model parts where the direction in which the model parts affect each other is directed in one of the two possible directions and determined by the block type (sensor or actuator).

Dedicated processing of certain model parts arrives at a more efficient executable representation of the model part and the overall model. However, at present the means to determine the model part that can be processed by a dedicated method is substantially restricted.

SUMMARY OF THE INVENTION

There is a need for a system and method that can more efficiently identify portions of a model that operate within substantially the same analysis framework and group such portions together for processing. The present invention is directed toward further solutions to address this need.

In accordance with one embodiment of the present invention, in a graphical modeling environment on a computational device, a method of processing a graphical model having at least two different analysis frameworks operating therein is provided. The method includes providing the model formed of a plurality of model components, each model component of the plurality of model components operating within one of the at least two different analysis frameworks. Each analysis framework relies upon a different dedicated algorithm from other analysis frameworks to derive solutions during processing. The method continues with identifying a plurality of model parts, each of the plurality of model parts being formed of at least one of the plurality of model components, and then identifying the analysis framework corresponding with each of the plurality of model parts. Each of the plurality of model parts is grouped together to form a plurality of model portions. Each model portion operates in one of the at least two different analysis frameworks. At least two of the model portions operating in a same analysis framework are topologically separated by at least one model portion operating in an analysis framework different from the at least two model portions operating in the same analysis framework. The at least one model portion operating in the analysis framework different from the at least two model portions operating in the same analysis framework is transformed to operate in the same analysis framework as the at least two model portions operating in the same analysis framework. The same analysis framework is not an executable block diagram.

In accordance with aspects of the present invention, transforming includes processing the plurality of model portions according to a dedicated algorithm of the plurality of dedicated algorithms corresponding to the analysis framework of the at least two different analysis frameworks to achieve intermediate processing results for each analysis framework, and converting the intermediate processing results for each analysis framework into a single model portion having a single dedicated algorithm corresponding to a single analysis framework within the graphical representation.

In accordance with further aspects of the present invention, the graphical representation has a plurality of single model portions resulting from conversion of intermediate processing results, such that the graphical model is not limited to a single analysis framework. The graphical representation can have at least one model portion resulting from conversion of intermediate processing results, such that the graphical model is limited to only a single analysis framework.

In accordance with further aspects of the present invention, the step of identifying a plurality of model parts includes recognizing a demarcating block to indicate boundaries of each model part of the plurality of model parts. Identifying the analysis framework can further include associating an analysis framework with the dedicated algorithm that corresponds to each of the plurality of model parts.

In accordance with further aspects of the present invention, each of the different dedicated algorithms derives sorted equations in block diagram form. The sorted equations can be at least partially formed of block diagram elements.

In accordance with further aspects of the present invention, the step of grouping each of the plurality of model parts together to form a plurality of model portions includes operating a selection mechanism to select and indicate which of the plurality of model parts is processed by the same dedicated algorithm, such that each of the resulting plurality of model portions is processed with a different dedicated algorithm.

In accordance with further aspects of the present invention, model parts are formed of at least one block. The at least one block is a polymorph block. The interpretation of the polymorph block can be based at least in part on an indication from a user based on interaction with the user.

In accordance with one embodiment of the present invention, in a computational device, a system for processing a graphical model formed of a plurality of model components, each model component of the plurality of model components operating within one of at least two different analysis frameworks, wherein each analysis framework relies upon a different dedicated algorithm from other analysis frameworks to derive solutions during processing, is provided. The system includes a part identification mechanism configured to identify a plurality of model parts, each of the plurality of model parts being formed of at least one of the plurality of model components. An analysis framework identification mechanism can be configured to identify the analysis framework corresponding with each of the plurality of model parts. A grouping mechanism can be configured to group each of the plurality of model parts together to form a plurality of model portions, wherein each model portion operates in one of the at least two different analysis frameworks, and wherein at least two of the model portions operating in a same analysis framework are topologically separated by at least one model portion operating in an analysis framework different from the at least two model portions operating in the same analysis framework. A transforming mechanism can be configured to modify the at least one model portion operating in the analysis framework different from the at least two model portions operating in the same analysis framework to operate in the same analysis framework as the at least two model portions operating in the same analysis framework. The same analysis framework is not an executable block diagram In accordance with aspects of the system of the present invention, the transforming mechanism can process the plurality of model portions according to a dedicated algorithm of the plurality of dedicated algorithms corresponding to the analysis framework of the at least two different analysis frameworks to achieve intermediate processing results for each analysis framework, and convert the intermediate processing results for each analysis framework into a single model portion having a single dedicated algorithm corresponding to a single analysis framework within the graphical representation.

In accordance with further aspects of the system of the present invention, the graphical representation can have a plurality of single model portions resulting from conversion of intermediate processing results, such that the graphical model is not limited to a single analysis framework. The graphical representation can have at least one model portion resulting from conversion of intermediate processing results, such that the graphical model is limited to only a single analysis framework.

In accordance with further aspects of the system of the present invention, the part identification mechanism can identify the plurality of model parts by recognizing a demarcating block in the model to indicate boundaries of each model part of the plurality of model parts.

In accordance with further aspects of the system of the present invention, the analysis framework identifier mechanism can identify the analysis framework corresponding with each of the plurality of model parts by associating an analysis framework with the dedicated algorithm that corresponds to each of the plurality of model parts.

In accordance with further aspects of the system of the present invention, the grouping mechanism can group each of the plurality of model parts together to form a plurality of model portions by operating a selection mechanism to select and indicate which of the plurality of model parts is processed by the same dedicated algorithm, such that each of the resulting plurality of model portions is processed with a different dedicated algorithm.

In accordance with further aspects of the system of the present invention, model parts are formed of at least one block. The at least one block is a polymorph block. The interpretation of the polymorph block is based at least in part on an indication from a user based on interaction with the user.

In accordance with one embodiment of the present invention, a medium for use in a graphical modeling environment on a computational device is provided. The medium holds instructions executable using the computational device for performing a method of processing a graphical model having at least two different analysis frameworks operating therein. The method includes providing the model formed of a plurality of model components, each model component of the plurality of model components operating within one of the at least two different analysis frameworks. Each analysis framework relies upon a different dedicated algorithm from other analysis frameworks to derive solutions during processing. The method continues with identifying a plurality of model parts, each of the plurality of model parts being formed of at least one of the plurality of model components, and then identifying the analysis framework corresponding with each of the plurality of model parts. Each of the plurality of model parts is grouped together to form a plurality of model portions. Each model portion operates in one of the at least two different analysis frameworks. At least two of the model portions operating in a same analysis framework are topologically separated by at least one model portion operating in an analysis framework different from the at least two model portions operating in the same analysis. framework. The at least one model portion operating in the analysis framework different from the at least two model portions operating in the same analysis framework is transformed to operate in the same analysis framework as the at least two model portions operating in the same analysis framework. The same analysis framework is not an executable block diagram.

BRIEF DESCRIPTION OF THE DRAWINGS

The present invention will become better understood with reference to the following description and accompanying drawings, wherein.

DETAILED DESCRIPTION

Figure 1:
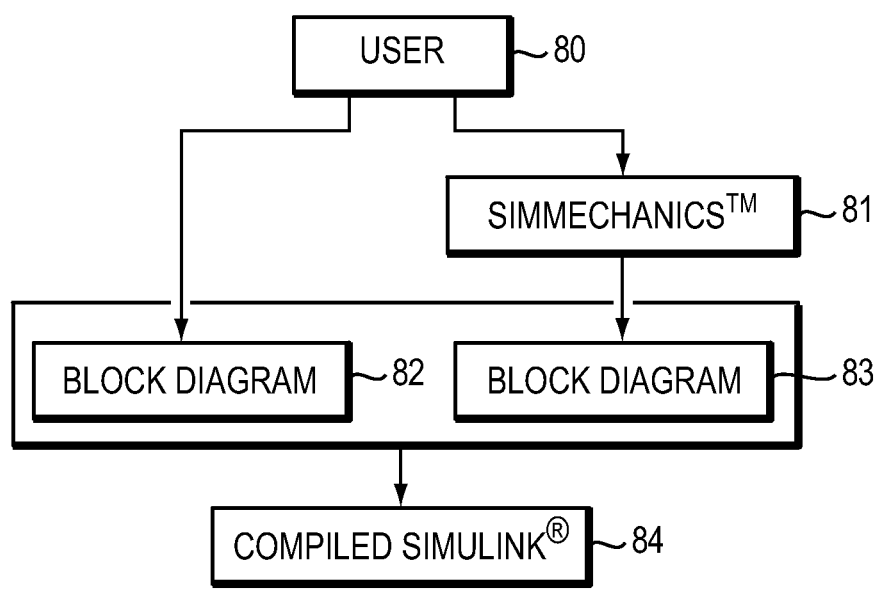
FIG. 1 is a diagrammatic illustration of a model having different analysis frameworks, according to one aspect of the present invention.
Figure 2:
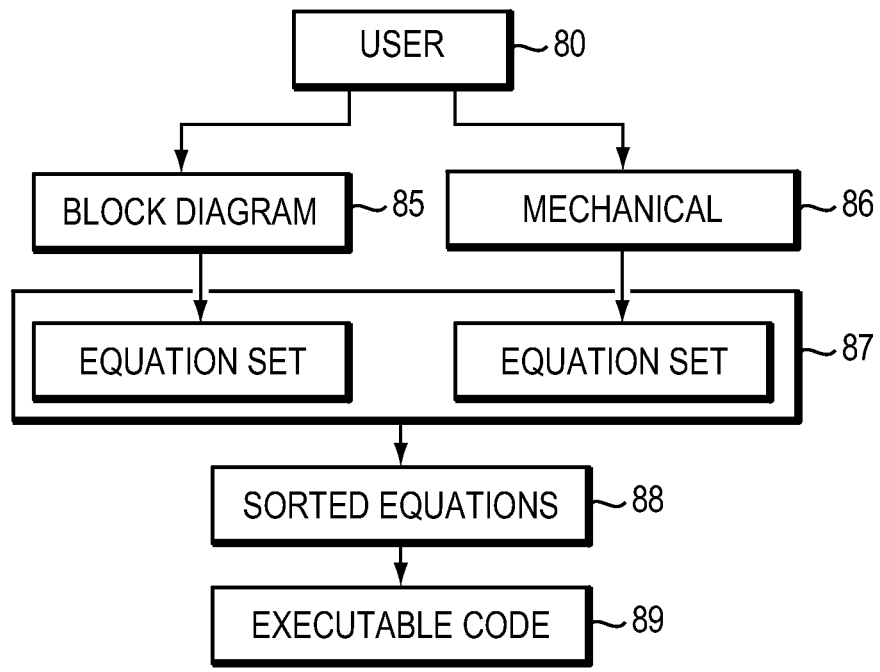
FIG. 2 is a diagrammatic illustration of a conventional approach to processing the model of FIG. 1, according to one aspect of the present invention.
Figure 3:
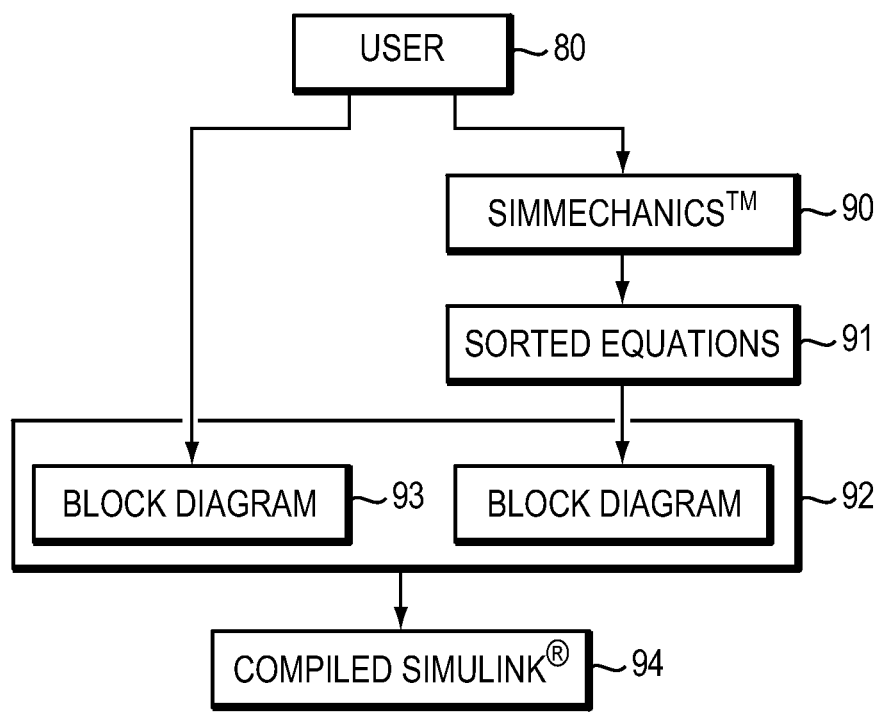
FIG. 3 is a diagrammatic illustration of an alternative conventional approach to processing the model of FIG. 1, according to one aspect of the present invention.

An illustrative embodiment of the present invention relates to a system and method for processing a graphical model having at least two different analysis frameworks operating therein. The method includes providing the model formed of a plurality of model components, each model component of the plurality of model components operating within one of the at least two different analysis frameworks. Each analysis framework relies upon a different dedicated algorithm for processing. A plurality of model parts are identified, each of the plurality of model parts being formed of at least one of the plurality of model components. The analysis framework corresponding with each of the plurality of model parts is then further identified. The model is then modified to group together model parts operating in the same analysis framework into model portions. Often, at this juncture, there are model portions operating in the same analysis framework, that are nonetheless topologically separated by model portions operating in a different analysis framework. This is the result of the original configuration of the model and location of model components. Where possible, the present invention identifies such topologically separated model portions and modifies the separating model portions to be amenable to operation within the analysis framework of the surrounding model portions. The processing of the model can then be carried out in a more efficient manner as a result of the modified configuration where model portions operating in a like analysis framework are processed together.

FIGS. 1 and 4 through 14, wherein like parts are designated by like reference numerals throughout, illustrate example embodiments of a system and method for processing models according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

It should be noted that the present description makes reference to a number of different specific software applications, such as Simulink®, SimMechanics™, SimPowerSystems™, SimDriveline™, and the like, provided by The MathWorks, Inc. of Natick, Mass. However, as utilized herein, all such references to specific software applications are merely intended to demonstrate example embodiments of how the system and method for processing models in accordance with the present invention can be implemented with existing software tools. The present invention is by no means limited to use with only the software applications mentioned. Other modeling and simulation software applications can be utilized in conjunction with the present invention to improve processing efficiencies. As such, the present invention anticipates use with combinations of the specific software applications discussed, as well as use with combinations of other modeling or simulation software applications not specifically identified herein. For exemplary purposes, as utilized herein, Simulink® refers generally to a signal-based modeling application, SimMechanics™ refers generally to a physics and mechanics modeling application, SimPowerSystems™ refers generally to an electrical power modeling application, and SimDriveline™ refers generally to rotating machine mechanics modeling.

Figure 4:
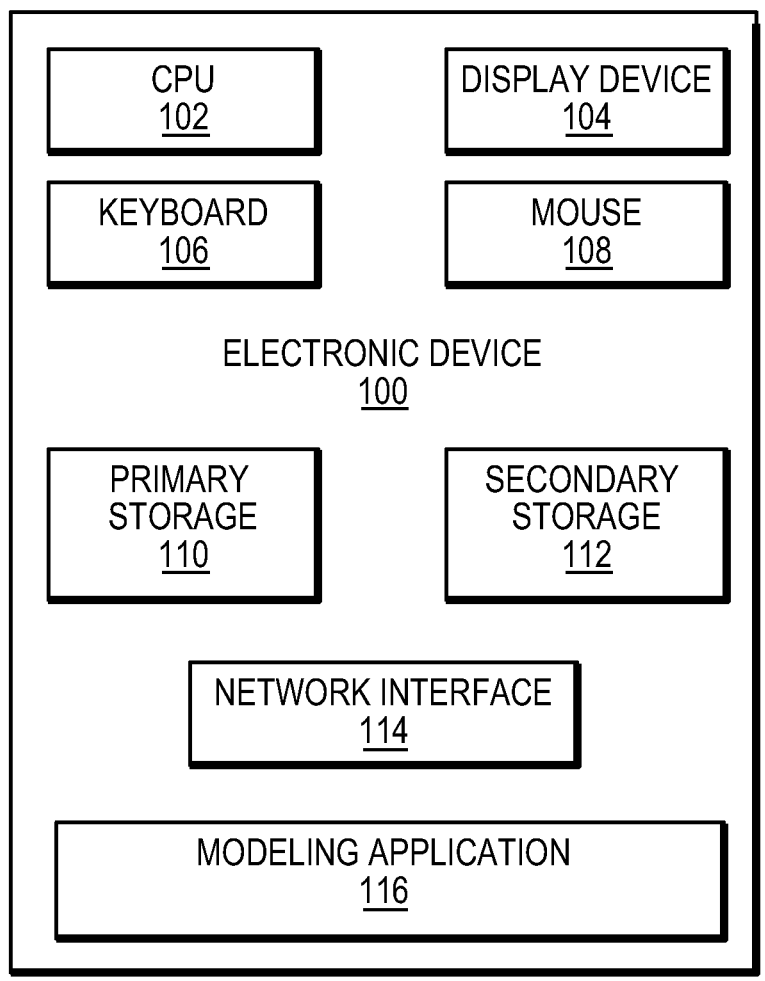
FIG. 4 is a diagrammatic illustration of a computational device for implementing the system and method of the present invention.

FIG. 4 illustrates one example embodiment of a computational device 100 suitable for practicing the illustrative embodiments of the present invention. The computational device 100 is representative of a number of different technologies, such as personal computers (PCs), laptop computers, workstations, personal digital assistants (PDAs), Internet appliances, cellular telephones, and the like. In the illustrated embodiment, the computational device 100 includes a central processing unit (CPU) 102 and a display device 104. The display device 104 enables the computational device 100 to communicate directly with a user through a visual display. The computational device 100 further includes a keyboard 106 and a mouse 108. Other potential input devices not depicted include a stylus, trackball, joystick, touch pad, touch screen, and the like. The computational device 100 includes primary storage 110 and secondary storage 112 for storing data and instructions. The storage devices 110 and 112 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 110 and 112. The computational device 100 can also include a network interface 114 for communicating with one or more electronic devices external to the computational device depicted. A modem is one form of network interface 114 for establishing a connection with an external computational device or network. The CPU 102 has either internally, or externally, attached thereto one or more of the aforementioned components. In addition to other applications, modeling applications 116, can be installed and operated on the computational device 100.

It should be noted that the computational device 100 is merely representative of a structure for implementing the present invention. However, one of ordinary skill in the art will appreciate that the present invention is not limited to implementation on only the described device 100. Other implementations can be utilized, including an implementation based partially or entirely in embedded code, where no user inputs or display devices are necessary. Rather, a processor can communicate directly with another processor or other device. It should further be noted that the present invention is not limited to electronic media. The method and system can be implemented on any computational platform, such as optical or biological computers.

Figure 5:
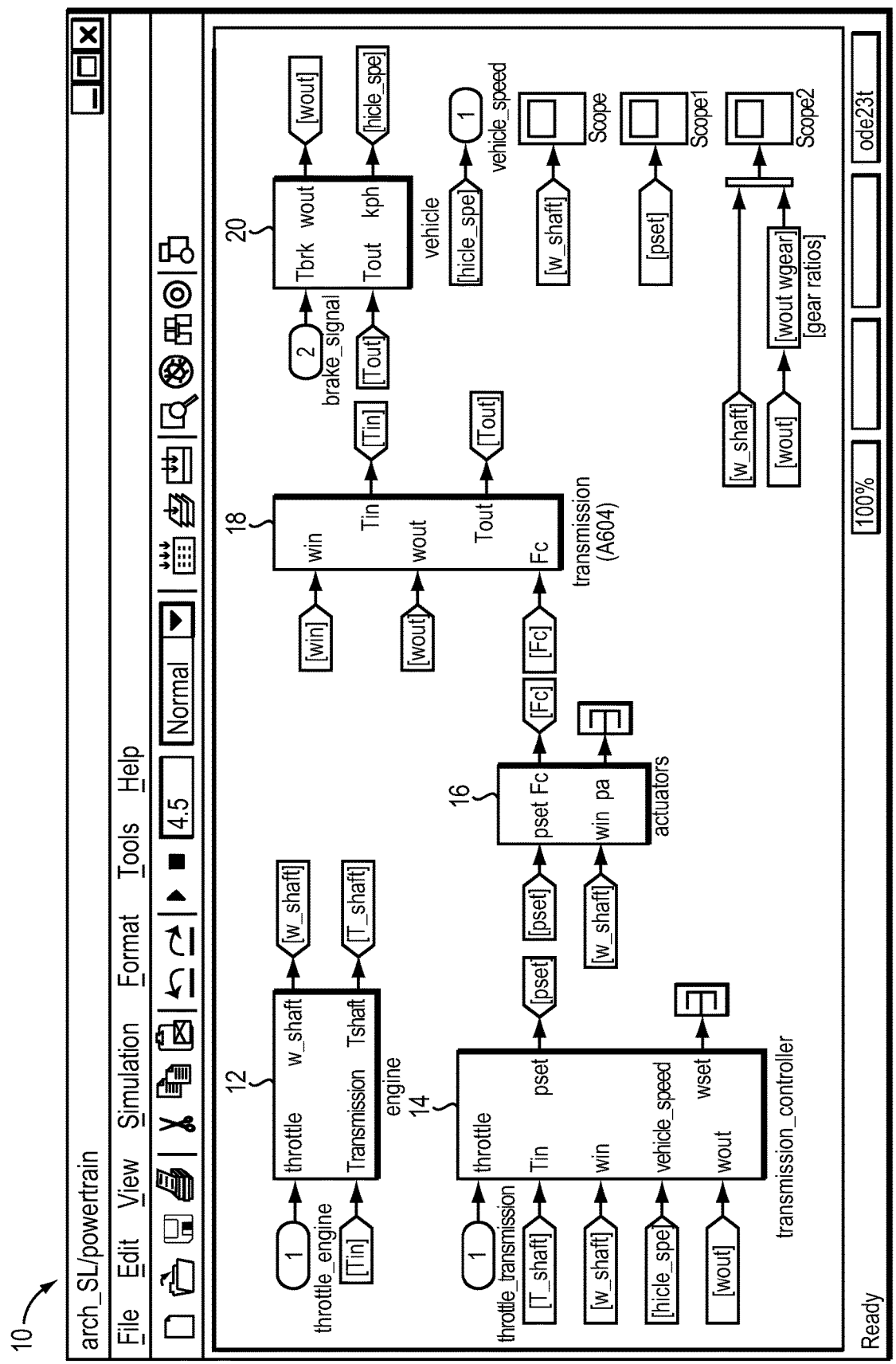
FIG. 5 is a schematic illustration of a model, according to one aspect of the present invention.

To better illustrate aspects of the present invention, an example model of a power train for an automobile captures a design process wherein different power train subsystems require different analysis frameworks to model accurately and conveniently. FIG. 5 is a diagrammatic illustration of an example power train model 10. The power train model includes an engine, a transmission, a transmission controller, and a vehicle. In the top-left corner, an engine model 12 is shown. Below the engine model 12 a transmission controller 14 is shown. To the right of the transmission controller 14, a transmission actuator model 16 is shown. To the right of the transmission actuator model 16, a transmission model 18 is shown. In the top-right corner, a vehicle model 20 is shown.

Once the architecture of the power train model 10 is defined, a user can experiment with different types of engines, different types of transmissions, and different types of vehicles to study and improve the performance of the overall combination. Such a modeling and experimenting process requires that the interfaces of each of the architectural primitives have the same interface.

To support physics modeling, Simulink® facilitates modeling tools that are specific to a particular domain, e.g., SimMechanics™ to the multi-body domain. SimPowerSystems™ to the power electronics domain, and SimDriveline™ to the driveline domain. These physics modeling languages are especially well-suited by means of energy-connections, i.e., a connection between blocks typically carries more than one variable and as such captures the flow of energy or power. For example, in SimDriveline™, each connection consists of a torque and angular velocity, the product of which is power.

Figure 6:
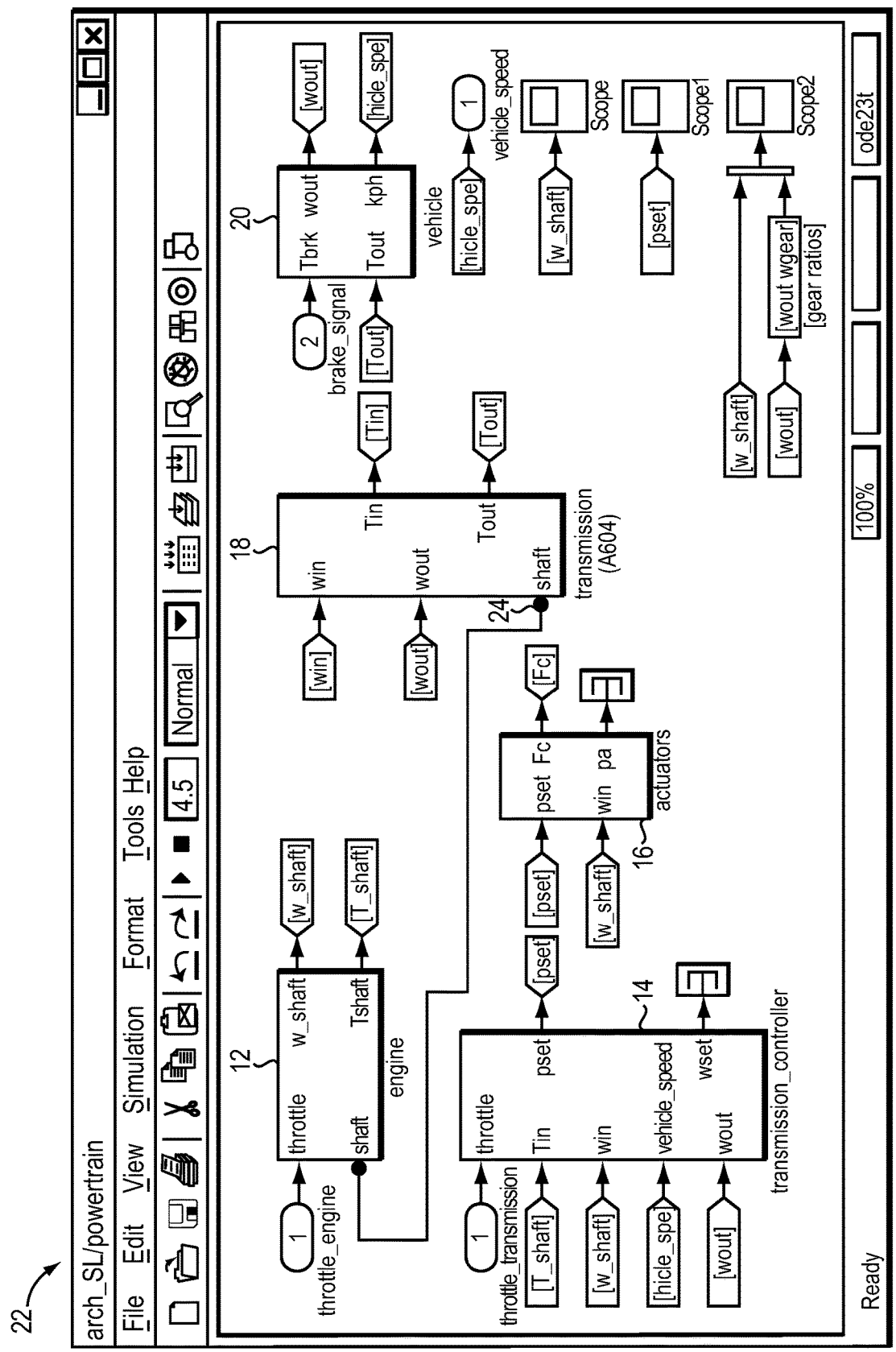
FIG. 6 is a schematic illustration of a modified version of the model of FIG. 5, according to one aspect of the present invention.

Using SimDriveline™ to model the engine and transmission plants, results in a slightly modified power train model 22, as shown in FIG. 6. Relative to the power train model 10 of FIG. 5, the modified power train model 22 has a SimDriveline™ connection 24, indicated by a round circle, which is different from the Simulink® signal connections, indicated by arrows throughout the model 22. The inclusion of the SimDriveline™ connection 24 in the Simulink® signal-based power train model 22 creates an incompatibility between the model components. Accordingly, the A604 transmission model 18 must use SimDriveline™ connections in its interface. As such, any other transmission models that are all Simulink® signal-based models, without the ability to receive SimDriveline™ connection data, are precluded from efficient usage in this power train model 22 prior to the introduction of the present invention.

The SimDriveline™ connection is useful to have the dedicated SimDriveline™ algorithms employed in generating an efficient executable model representation. If the engine model 12 and A604 transmission model 18 were connected by the signal interface as shown in FIG. 5, demarcating blocks in the form of sensors and actuators are required to separate out the SimDriveline™ model parts of the respective subsystems. As a result, two sets of ordered equations would be generated for the separate SimDriveline™ model parts, as shown in FIG. 1, and this leads to less efficient execution.

The system and method of the present invention automatically determines the model parts that can be processed by specific dedicated algorithms. The method automatically finds the maximum partitions in a model that still allow dedicated model processing.

Figure 7:
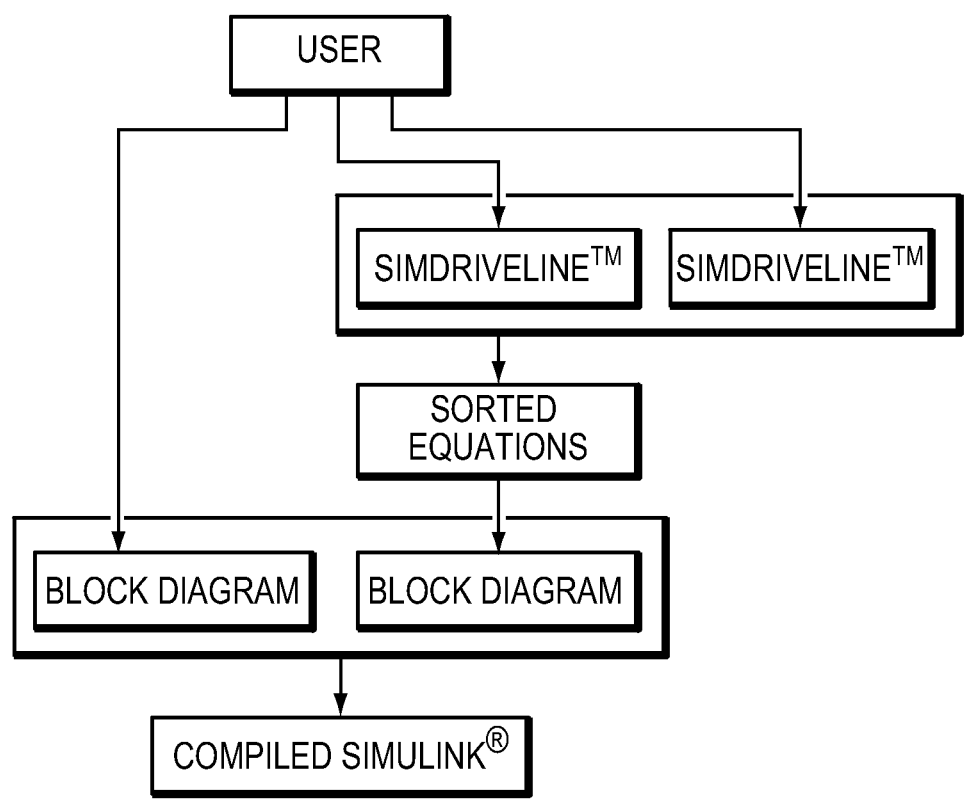
FIG. 7 is a diagrammatic illustration of the processing of the model of FIG. 6, according to one aspect of the present invention.

For example, for the power train model 10 shown in FIG. 5, if the architecture in FIG. 6 is used and the engine model 12 and A604 transmission model 18 contain separate SimDriveline™ model parts, the analysis stage of the present invention finds that the different parts can be processed as one. The arrangement for processing the architecture of FIG. 6 is shown in FIG. 7, where the two SimDriveline™ model parts are combined and then processed into one set of sorted equations. These sorted equations are then made available in block diagram format, for combination with the rest of the model, which consists of block diagrams. Model parts can also be processed in different ways. For example, a gain block can be utilized in a mechanical body analysis framework to model velocity and force as a polymorph block.

Figure 8:
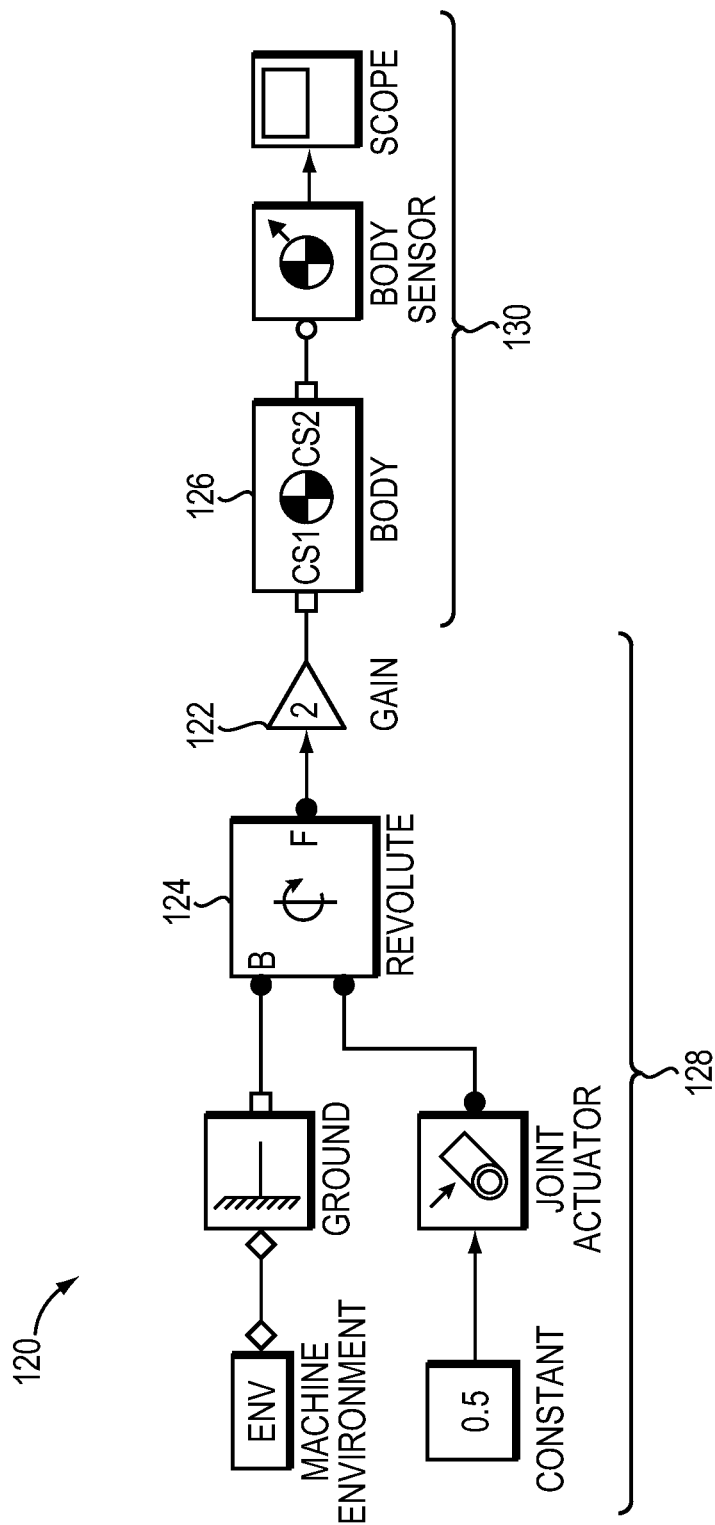
FIG. 8 is a diagrammatic illustration of a model, according to one aspect of the present invention.

To illustrate, consider the SimMechanics™ model 120 in FIG. 8. Here, a Gain block 122 that is part of the executable block diagram domain connects a Revolute block 124 and a Body SimMechanics™ block 126. There is no explicit demarcation between an executable block diagram domain 128 and SimMechanics™ blocks 130 by means of sensors and/or actuators. The Gain block 122 is automatically identified, as being an element of the executable block diagram domain and its behavior is interpreted in the SimMechanics™ domain. In accordance with one embodiment of the invention, the functionality of the Gain block 122 is applied to the force that acts between the Revolute block 124 and the Body SimMechanics™ block 126 by multiplying the force by a factor 2, for example, or the reciprocal, depending on the computational direction of the force and the input/output relation of the Gain block 122. If the force is computed on the input of the Gain block 122, the factor of 2 is applied, if the force is computed on the output, the reciprocal factor of 0.5 is applied. One of ordinary skill in the art will appreciate that other gain factors can be applied in this example.

In another embodiment of the invention, the Gain factor is applied similarly to both velocity and force. In yet another embodiment the Gain factor is applied similarly to only the velocity. One skilled in the art will recognize that similar applications of polymorph behavior can be devised without departing from the scope of the present invention.

Figure 9A:
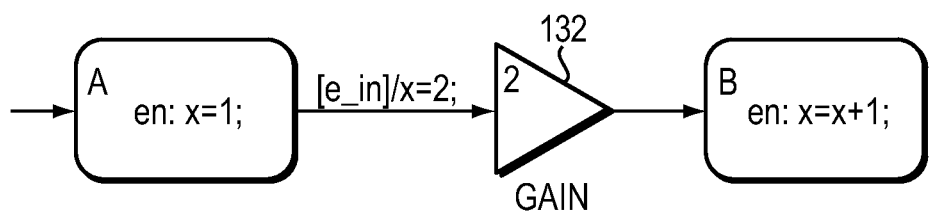
FIGS. 9A and 9B are a diagrammatic illustrations of the processing of the model of FIG. 8, according to one aspect of the present invention.
Figure 9B:
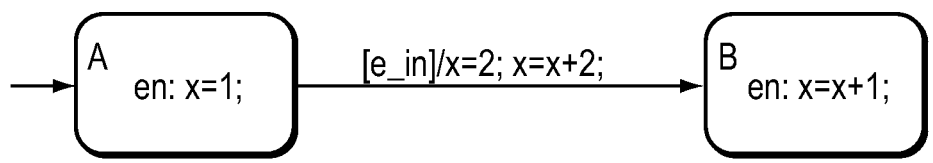

Similarly, such polymorphism can be applied in different domains. For example, the use of a Gain block 132 in a Stateflow® model could be interpreted as a multiplication of sorts that fits the Stateflow® analysis framework. Referring now to FIGS. 9A and 9B, a Stateflow® diagram is shown in FIG. 9A that consists of two states A and B. Upon initialization, state A is entered and the output x is set to the value 1. When the condition e_in becomes true, the transition out of state A is taken, which first changes the value of x to 2. Next, the Gain block 132 is interpreted as a multiplication of values assigned in the transition and so the value of x becomes 4. Finally, state B is entered and the entry action increments x by 1. The final value of x after the transition is, therefore, 5. To achieve this behavior, the polymorph Gain block 132 can first be translated to fit the Stateflow® analysis framework as shown in FIG. 9B.

In accordance with one embodiment of the invention, the demarcating of model portions that can be operated on by different analysis frameworks is achieved by dedicated blocks such as sensor and actuator blocks. In accordance with another embodiment of the invention, the model portions that can be operated on by different analysis frameworks that are identified by the types of blocks, by identifying the types of ports used for the connection, or by identifying the types of connections. Those of ordinary skill in the art will appreciate that further means to demarcate model portions that can be operated on by different analysis frameworks can be devised without departing from the scope of the invention.

Figure 10:
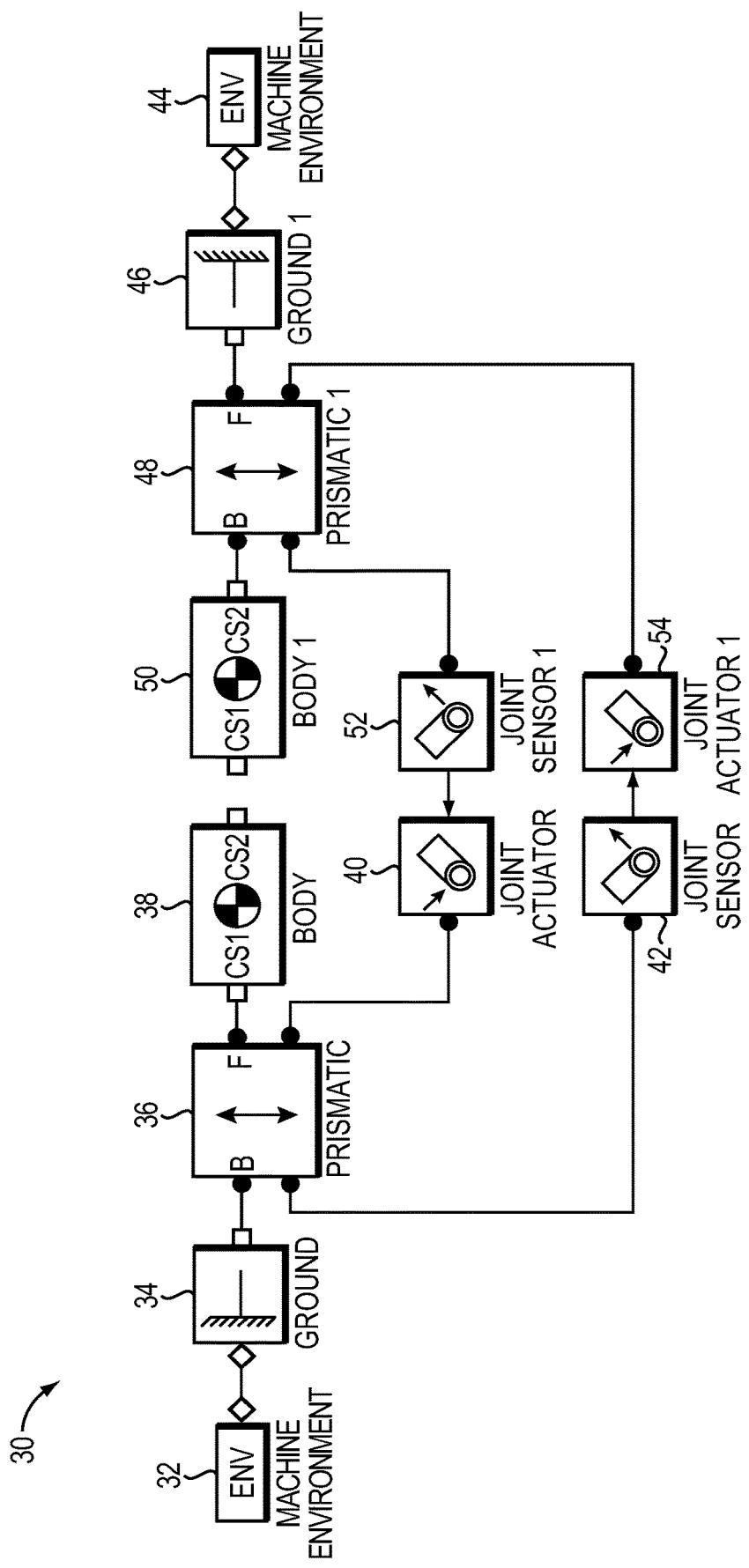
FIG. 10 is a schematic illustration of a model, according to one aspect of the present invention.

Turning now to a different illustrative example as shown in FIG. 10, the method of processing a graphical model having at least two different analysis frameworks operating therein occurs as described below.

In FIG. 10, an example model 30 is shown. The model 30 includes a first machine environment model 32, a first ground model 34, a first prismatic model 36, and a first body model 38. The model further includes a second machine environment model 44, a second ground model 46, a second prismatic mode 148, and a second body model 50. The model parts are separated by demarcating sensor and actuator blocks in the form of a first joint actuator 40, a first joint sensor 42, a second joint actuator 54, and a second joint sensor 52. Accordingly, the model parts are separated by sensors 42 and 52, and actuators 40 and 54.

Figure 11:
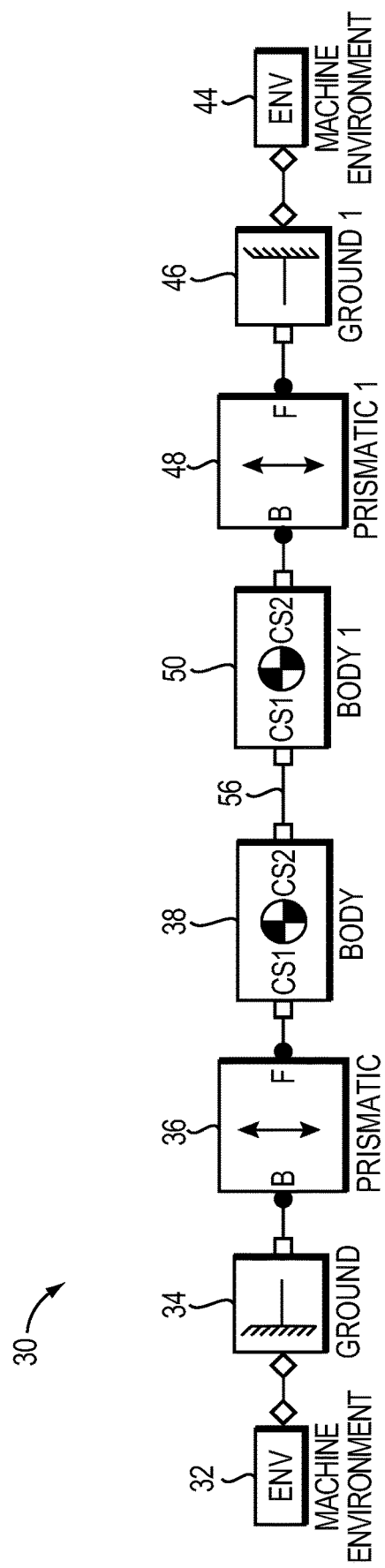
FIG. 11 is a schematic illustration of a modified version of the model of FIG. 10, according to one aspect of the present invention.

In accordance with the present invention, components within a model that are separated by demarcating blocks such as sensors and actuators are first identified. The demarcating blocks provide a logical separation between components that themselves operate within a single analysis framework. Components separated by demarcating blocks can operate within a same analysis framework, or a different analysis framework. In accordance with the present invention, the method analyzes whether there are demarcating block combinations that separate model parts that can be processed by the same dedicated algorithms. If such situations exist, the demarcating blocks, such as the sensor/actuator pairs, are removed and the model parts are merged according to the properties selected on the sensor/actuator pair, resulting in modification of the model 30 to that which is shown in FIG. 11. It should be noted, that this modified model is only shown for illustrative purposes. It is not an essential part of the embodiment of the invention to generate the modified model in a block diagram representation first.

The first joint actuator 40, first joint sensor 42 second joint actuator 54, and second joint sensor 52 are used to allow connecting mechanical body analysis framework blocks to regular Simulink® signal blocks. However, in this example, no Simulink® blocks are present between each connected sensor/actuator pair (first joint actuator 40, first joint sensor 42, second joint actuator 54, and second joint sensor 52). Therefore, the two mechanical body analysis framework blocks (i.e., SimMechanics™ model parts) can, be combined as if a direct connection between the first body model 38 and the second body mode 150 existed, as shown in FIG. 11.

After the mechanical body analysis framework blocks (i.e., SimMechanics™ model parts) are identified, the sensor/actuator pairs are analyzed. In FIG. 10, the two sensor/actuator pairs (i.e., first joint actuator 40, first joint sensor 42, second joint actuator 54, and second joint sensor 52) are found to operate on the same bodies in two different SimMechanics model parts (i.e., the first body model 38 and the second body model 50). Moreover, one sensor/actuator pair operates on the force between the bodies and the other on the velocity. Such an arrangement is identical to a direct power connection that carries both force and velocity as across and through variables. The sensor/actuator pairs (first joint actuator 40, first joint sensor 42, second joint actuator 54, and second joint sensor 52) are replaced by a direct connection 56, as shown in FIG. 11. This model can be maintained as an internal configuration, or can be displayed to the user.

Figure 12:
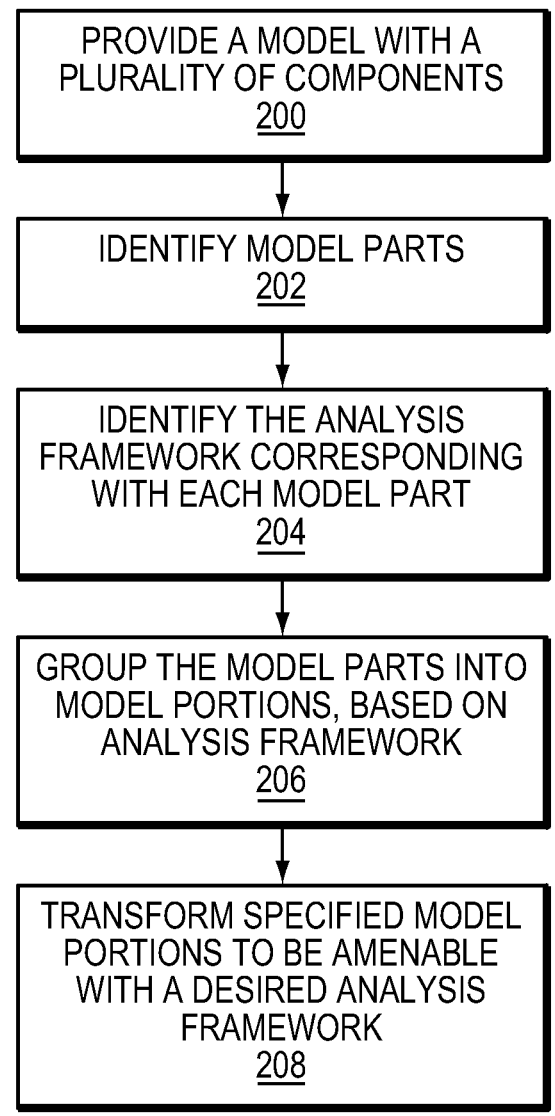
FIG. 12 is a flowchart illustrating a method of processing a model, according to one aspect of the present invention.
Figure 13:
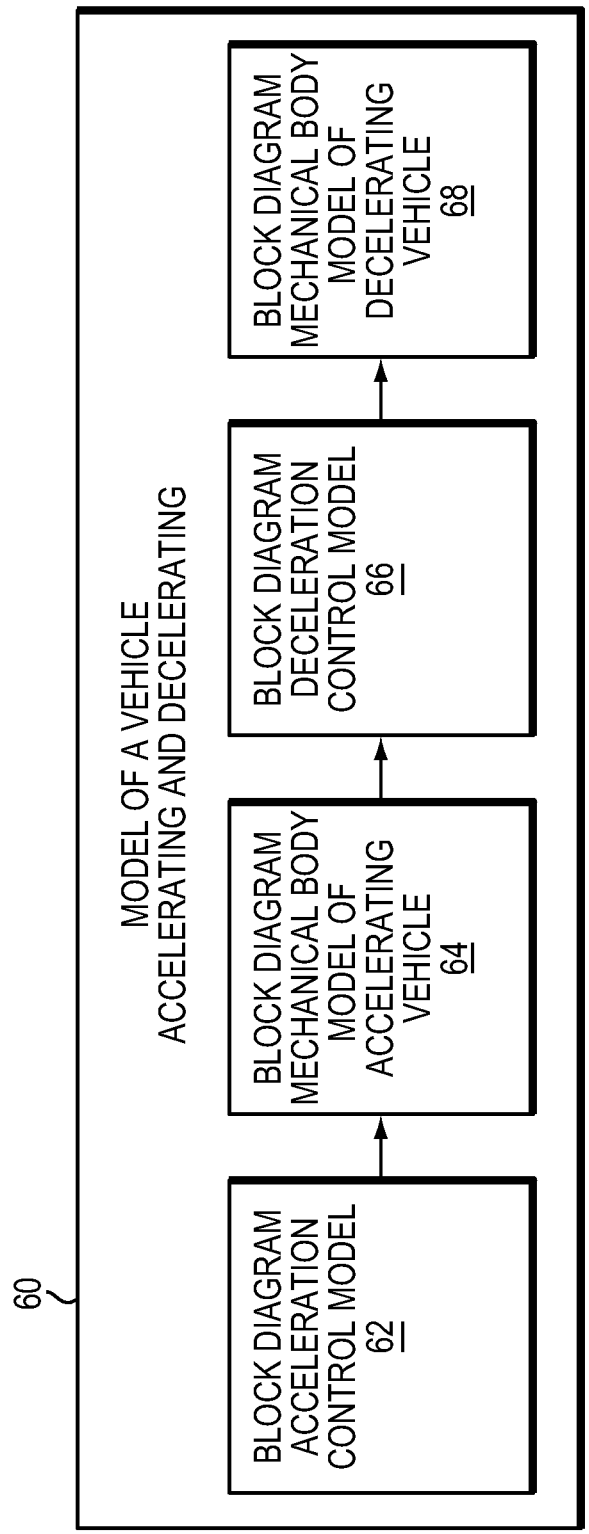
FIG. 13 is a schematic illustration of a model having topologically separated components of similar analysis frameworks, according to one aspect of the present invention.
Figure 14:
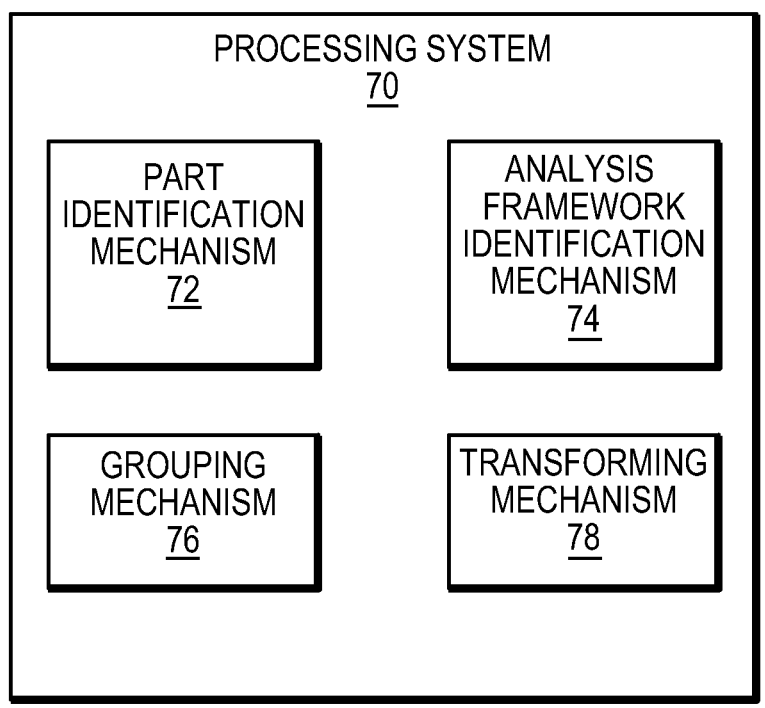
FIG. 14 is a diagrammatic illustration of the system for processing the model, according to one aspect of the present invention.

Taking the above discussion one step further beyond a model having multiple model parts in a same analysis framework, FIG. 12 is a flowchart illustrating one example embodiment of the method of processing a graphical model having at least two different analysis frameworks operating therein in accordance with the present invention. FIG. 13 is a diagrammatic illustration of a model 60 undergoing the method of processing shown in FIG. 12. First, the model 60 is provided, being formed of a plurality of model components (step 200). Each model component of the plurality of model components operates within an analysis framework. As discussed previously, each analysis framework is defined upon its reliance on a different dedicated algorithm to process and derive solutions. Model components can be formed of at least one block, such as a polymorph block. Further, the interpretation of the polymorph block for purposes of the following method can be based at least in part on an indication from a user based on interaction with the user.

The example model 60 represents acceleration and deceleration of a vehicle. There is a control signal analysis framework in which an acceleration control model 62 operates, a mechanical body analysis framework in which a mechanical body model of an accelerating vehicle 64 operates, a control signal analysis framework in which deceleration control model 66 operates, and a mechanical body analysis framework in which a mechanical body model of a decelerating vehicle 68 operates. As can be seen, the mechanical body analysis frameworks are topologically separated from the control signal analysis frameworks.

Each of the model 60 parts is identified (step 202) and the analysis framework corresponding with each of the plurality of model parts is likewise identified (step 204). Each of the model parts is grouped together to form a plurality of model portions (step 206). Each model portion operates in one of the different analysis frameworks. In some instances, such as in the example model 60, model portions that use the same dedicated algorithms and thus the same analysis framework are topologically separated by at least one model portion operating in a different analysis framework. In the example model 60, the acceleration control model 62 and the deceleration control model 66 operate in the control signal analysis framework, and they are separated by the model of the accelerating vehicle 64 and the model of the decelerating vehicle 68, which operate in the mechanical body analysis framework and are likewise topologically separated themselves. Each of the components that separate the acceleration control model 62 and the deceleration control model 66 operate in a different analysis framework than the mechanical body analysis framework of the model of the accelerating vehicle 64 and the model of the decelerating vehicle 68. Grouping each of the plurality of model parts together to form a plurality of model portions can be accomplished by operating a selection mechanism to select and indicate which of the plurality of model parts is processed by the same dedicated algorithm. Each of the resulting model portions is processed with a different dedicated algorithm corresponding to the analysis framework, as described below.

The method continues with transforming the model portions operating in the analysis framework different from the at least two model portions operating in the same analysis framework to operate in the same analysis framework as the at least two model portions operating in the same analysis framework (step 208). In the example model 60, the model of the accelerating vehicle 64 and the model of the decelerating vehicle 68 are separated by the deceleration control model 66. Accordingly, the deceleration control model 66 is transformed to be amenable to the mechanical body analysis framework of the model of the accelerating vehicle 64 and the model of the decelerating vehicle 68.

The model can then be processed using the dedicated algorithms for the particular analysis framework that was identified. Each of the different dedicated algorithms can derive sorted equations in block diagram form. The sorted equations can be at least partially formed of block diagram elements, if desired.

The method of transforming, in accordance with one embodiment, includes processing model portions according to a dedicated algorithm corresponding to the analysis framework to achieve intermediate processing results for each analysis framework. The intermediate processing results for each analysis framework are then converted into a single model portion having a single dedicated algorithm corresponding to a single analysis framework within the model. The model can thus have a plurality of single model portions resulting from conversion of intermediate processing results, such that the graphical model is not limited to a single analysis framework. Alternatively, the model can thus have a plurality of model portions resulting from conversion of intermediate processing results in a manner such that the graphical model is limited to a single analysis framework Referring to FIG. 14, the method of the present invention can be carried out on a computational device, such as that described in FIG. 4, by a processing system 70. The system 70 for processing the graphical model is designed to handle models having a plurality of model components, where each model component operates within one of at least two different analysis frameworks. Such that each model that can make use of the processing system 70 fully has two or more analysis frameworks operating within the model. Each analysis framework relies upon a different dedicated algorithm to derive solutions during processing. The system 70 can include a part identification mechanism 72. The part identification mechanism is configured to identify a plurality of model parts, each part being formed of at least one of the plurality of model components.

An analysis framework identification mechanism 74 is configured to identify the analysis framework corresponding with each of the plurality of model parts. A grouping mechanism 76 is configured to group each of the plurality of model parts together to form a plurality of model portions. Each of the model portions operates in one of the analysis frameworks of the model. At least two of the model portions operate in the same analysis framework, but are topologically separated by at least one model portion operating in a different analysis framework.

A transforming mechanism 78 is configured to modify the at least one model portion operating in the analysis framework that is topologically separating the other model portions to be operationally amenable to working in the analysis framework of the portions being separated. As such, the transforming mechanism 78 returns a model portion that can be processed in a different analysis framework from its original analysis framework, one that is compatible with other topologically surrounding model portions. Such a configuration improves the processing efficiency of the model.

In accordance with the present invention, components within a model that are separated by demarcating blocks are first identified. The demarcating blocks, such as sensors and actuators, provide a logical separation between components that themselves operate within a single analysis framework. Components separated by demarcating blocks can operate within a same analysis framework, or a different analysis framework. In instances where the analysis framework is different there may be opportunity for the method of the present invention to improve processing of that model as described herein. In such instances, the method analyzes whether there are sensor/actuator combinations that separate model parts that can be processed by the same dedicated algorithms. If such situations exist, the exemplary sensor/actuator pairs are removed and the model parts are merged according to the properties selected on the sensor/actuator pair.

Figure 15:
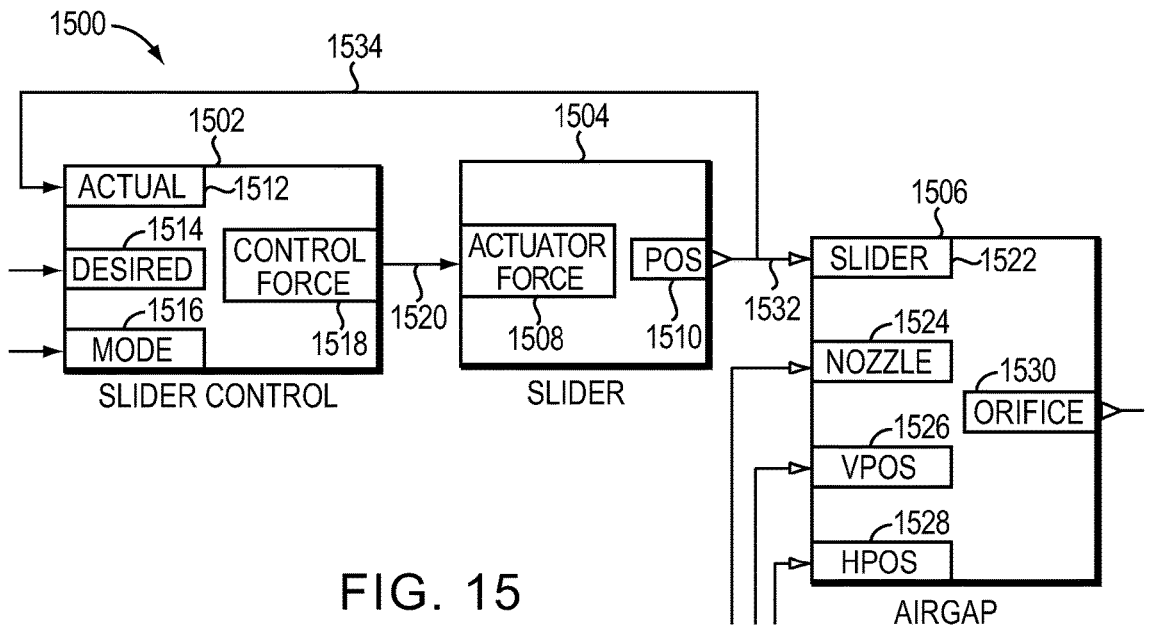
FIG. 15 is a schematic illustration of a graphical model, according to an embodiment of the present invention.

FIG. 15 is a schematic illustration of an executable graphical model 1500 representing part of a surface mount device system. The system represented by the graphical model 1500 may be used to move a slider and nozzle over an electrical component, lower the nozzle in order to pick up the component, raise the nozzle to lift the component, move the slider to a new position where the component is to be attached to a printed circuit board, and lower the nozzle in order to attach the component to the board. The model 1500, which may be created by a user, for example by the modeling application 116 (FIG. 4) and may be received by the processing system 70 (FIG. 14), includes a plurality of subsystems or parts, such as a slider control subsystem 1502, a slider subsystem 1504, and an airgap subsystem 1506. The subsystems 1502, 1504, and 1506 may be connected to model the operation of the surface mount device system.

Specifically, the slider subsystem 1504 may model the slider of the surface mount device system. The slider subsystem 1504 may take an actuator force value as an input, and compute a position of the slider as an output. Accordingly, the slider subsystem 1504 may have an actuator force input port 1508, and a position (pos) output port 1510. The slider control subsystem 1502 may compute an actuator force value as a control force based on an actual position of the slider, a desired position of the slider, and a mode of operation. Accordingly, the slider control subsystem 1502 may include an actual position input port 1512, a desired position input port 1514, and a mode input port 1516. It may also include a control force output port 1518. The control force output port 1518 may be connected to the actuator force input port 1508, as illustrated by connection arrow 1520.

The airgap subsystem 1506 may compute an orifice, e.g., a surface, between the nozzle and the electrical component to be picked up. The computation of the orifice value may be based on a vertical position (vpos) and a horizontal position (hpos) of the component and on vertical (nozzle) and horizontal (slider) positions of the nozzle. As the nozzle moves closer to the electrical component both horizontally and vertically, the airgap orifice may decrease and a force applied to the component, based on the airflow through the nozzle, may increase. Accordingly, the airgap subsystem 1506 may include a slider input port 1522, a nozzle input port 1524, a vpos input port 1526, an hpos input port 1528, and an orifice output port 1530. Furthermore, the pos output port 1510 of the slider subsystem 1504 may be connected to the slider input 1522 of the airgap subsystem 1506, as illustrated by connection arrow 1532. In an embodiment, the pos output port 1510 may also be connected to the actual input port 1512 of the slider control subsystem 1502, as illustrated by connection arrow 1534, which is shown branching off from arrow 1532

The slider subsystem 1504 and the airgap subsystem 1506 may both operate in a non-causal equation system analysis framework. The slider control subsystem 1502 may operate in a time-based block diagram analysis framework. An exemplary non-causal equation system analysis framework within a physical domain (e.g., mechanical, electrical, and hydraulic) is provided by the Simscape™ software product from The MathWorks, Inc. An exemplary time-based block diagram analysis framework within a control system domain is the Simulink® modeling system from The MathWorks, Inc. The slider subsystem 1504 may include one or more demarcating blocks or other elements (not shown) that translate the control force value computed by the slider control subsystem 1502 from a time-based block diagram analysis framework to a non-causal equation system analysis framework for use by the slider subsystem 1504 in its computation of the position (pos) value.

Figure 16:
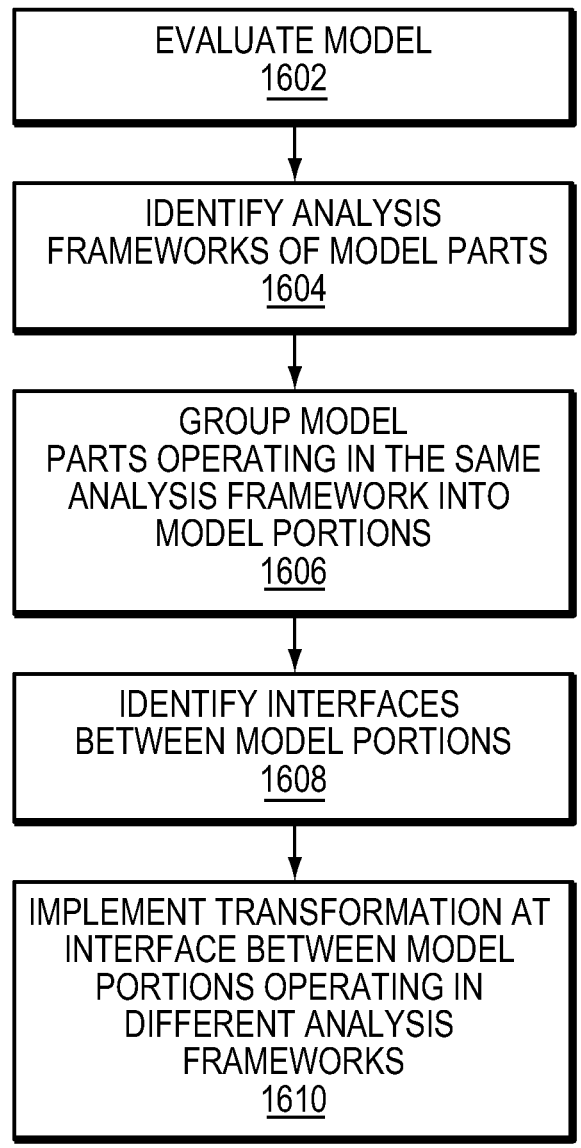
FIG. 16 is a flowchart illustrating a method of processing a model, according to an embodiment of the present invention.

FIG. 16 is a flow diagram of a method in accordance with an embodiment of the invention. The processing system 70 (FIG. 14) may evaluate the model, as indicated at block 1602. In particular, the analysis framework identification mechanism 74 may identify the analysis frameworks in which the various parts of the model 1500 operate, as indicated at block 1604. In this example, the analysis framework identification mechanism 74 may determine that part of the slider subsystem 1504 and the airgap subsystem 1506 operate in the non-causal equation system analysis framework, while part of the slider subsystem 1504 and the slider control subsystem 1502 operate in the time-based block diagram analysis framework. The grouping mechanism 76 may group those model parts determined to operate in the same analysis framework into model portions, as indicated at block 1606. The analysis framework identification mechanism 74 also may identify the interfaces between model portions, as indicated at block 1608. Here, the analysis framework identification mechanism 74 may determine that connection arrow 1534 represents an interface between the model portion of slider subsystem 1504 that operates in the non-causal equation system analysis framework and the model portion of slider control subsystem 1502 that operates in the time-based block diagram analysis framework.

In model 1500, slider control subsystem 1502 represents part of a model portion, airgap subsystem 1506 represents part of a model portion, and slider subsystem 1504 represents parts of two model portions. In other embodiments, a subsystem may include a plurality of model portions operating in different analysis frameworks.

The transforming mechanism 78 may implement a transformation at one or more interfaces identified in the model disposed between model portions operating in different analysis frameworks, as indicated at block 1610. For example, the transforming mechanism 78 may implement a transformation at the interface represented by the connection arrow 1534. The transformation may change the position value computed by the slider subsystem 1504 from the first analysis framework, e.g., the non-causal equation system analysis framework, to the second analysis framework, e.g., the time-based block diagram analysis framework. The transforming mechanism 78 may implement the transformation at the slider subsystem 1504, at the slider control subsystem 1502, or at one or more graphical elements representing the interface, such as one or more ports, connection lines or arrows, or blocks. For example, the transformation mechanism 78 may automatically insert one or more demarcating blocks, such as a sensor or an actuator block, in the slider subsystem 1504 or in the slider control subsystem 1502. One or more graphical elements representing the transformation may be added to the model 1500, thereby producing a modified version of the model. Alternatively, functionality representing the one or more demarcating blocks may be inserted in an in-memory representation of the model 1500.

As shown, by detecting an interface between model portions operating in different analysis frameworks, and automatically implementing a transformation at an interface disposed between those analysis frameworks, the user can simply connect subsystems operating in different analysis frameworks, as desired, and the processing system 70 will identify and manage the transformations. Additionally, the original analysis frameworks of the model portions and the dedicated algorithms upon which they rely may be preserved. One or more of the analysis frameworks, moreover, may preserver dynamic behavior, which may include nonlinearities, of the respective model portions in which they operate.

Figure 17:
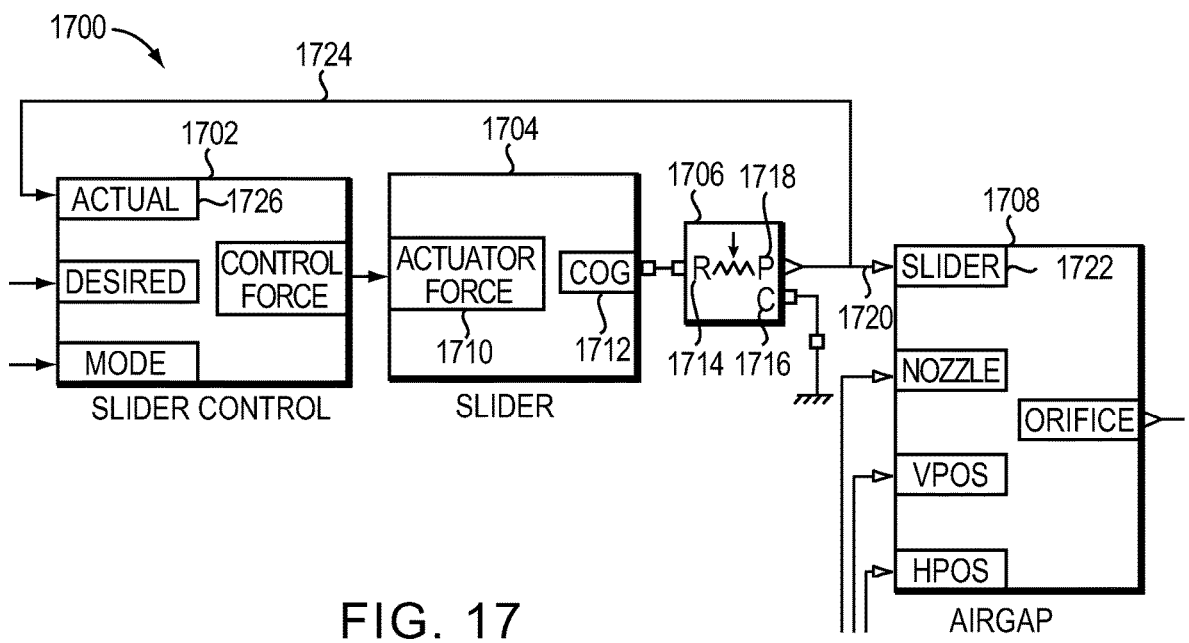
FIG. 17 is a schematic illustration of a graphical model, according to an embodiment of the present invention.

FIG. 17 is a schematic illustration of an executable graphical model 1700 that also represents part of a surface mount device system. The model 1700 includes a plurality of subsystems or parts, such as a slider control subsystem 1702, a slider subsystem 1704, a position block 1706, and an airgap subsystem 1708, which may be connected to model the surface mount device system. Specifically, the slider subsystem 1704 may model the slider of the surface mount device system, and may have an actuator force input port 1710 for receiving an actuator force value, and may compute output information (e.g., position, velocity, acceleration, force) regarding the center of gravity (COG) of the slider, and provide the computed information at a COG output port 1712. The position block 1706 may determine the position of the slider's COG with respect to a reference point. The position block 1706 may have a first input port 1714, labeled a', for receiving the COG information from the slider subsystem 1704, a second input port 1716, labeled 'C', for receiving the reference point, and an output port 1718, labeled T', that provides the computed position of the slider's COG.

A first interface, represented by position block 1706, is disposed between the COG output port 1712 of the slider subsystem 1704 and a slider input port 1722 of the airgap subsystem 1708. A second interface, represented by connection arrow 1724, is disposed between the connection arrow 1720 and an actual input port 1726 of the slider control subsystem 1702.

Part of the slider subsystem 1704 and the position block 1706 may both operate in a first analysis framework, such as a multi-body analysis framework. The slider control subsystem 1702 may operate in a second analysis framework, such as a time-based block diagram (or control system) analysis framework. Part of the position block 1706 and the airgap subsystem 1708 may operate in a third analysis framework, such as a non-causal equation system analysis framework. The slider subsystem 1704 may include one or more demarcating blocks or other elements (not shown) that transform a control force value computed by the slider control subsystem 1702 from the time-based block diagram analysis framework to the multi-body analysis framework for use by the slider subsystem 1704 in its computation of the slider's COG.

The processing system 70 may evaluate the graphical model 1700 as indicated at block 1602 of FIG. 16. Specifically, the analysis framework identification mechanism 74 may identify the analysis frameworks in which the various parts of the model 1700 operate, as indicated at block 1604. Here, the analysis framework identification mechanism 74 may determine that the slider control subsystem 1702 and part of the slider subsystem 1704 operate in a time-based block diagram analysis framework, that part of the slider subsystem 1704 and the position block 1706 operate in a multi-body analysis framework, and that part of the position block 1706 and airgap subsystem 1708 operate in a non-causal equation system analysis framework. The grouping mechanism 76 may group those model parts determined to operate in the same analysis framework into model portions, as indicated at block 1606. The analysis framework identification mechanism 74 also may identify the interfaces between model portions, as indicated at block 1608. With respect to the graphical model 1700, the analysis framework identification mechanism 74 may identify a first interface between the slider subsystem 1704, operating in the multi-body analysis framework, and the airgap subsystem 1708, operating in the non-causal equation system analysis framework. The first interface being represented in the model 1700 by the position block 1706. The analysis framework identification mechanism 74 may also identify a second interface between the position block 1706, operating in the multi-body analysis framework, and the slider control subsystem 1702 operating in the time-based block diagram analysis framework. The second interface being represented in the model 1700 by the connection arrow 1724.

As discussed, the transforming mechanism 78 may implement a transformation at an identified interface disposed between model portions operating in different analysis frameworks, as indicated at block 1610. Regarding the graphical model 1700, the transforming mechanism 78 may implement a transformation for the first interface represented by position block 1706 that transforms the COG position information computed by the slider subsystem 1704 from the multi-body analysis framework to the non-causal equation system analysis framework. The transforming mechanism 78 also may implement a transformation at the second interface represented by connection arrow 1724 that transforms the position value computed by the position block 1706 from the non-causal equation system analysis framework to the time-based, block diagram analysis framework. Alternatively, or additionally, the transforming mechanism 78 may implement a transformation at the second interface represented by connection arrow 1724 that transforms the COG position information computed by the slider subsystem 1704 from the multi-body analysis framework to the time-based block diagram analysis framework.

The transforming mechanism 78 may implement the transformations by automatically inserting one or more demarcating blocks, such as sensor or actuator blocks, in the position block 1706, the airgap subsystem 1708, or the slider control subsystem 1702, thereby modifying the visual representation of the model 1700. Alternatively, functionality representing the one or more demarcating blocks may be inserted in an in-memory representation of the model 1700 without modifying the visual representation of the graphical model 1700.

In an embodiment, the grouping mechanism 76 may partition a model portion operating in the same analysis framework at an interface. For example, the non-causal equation system model portion of the graphical model 1500 may be partitioned into two model portions, and the partition may be based on the interface disposed between the non-causal equation system model portion and the time-based block diagram model portion.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable roles of law.

What is claimed is:

1. A non-transitory, computer-readable storage medium with an executable program stored thereon, the executable program comprising instructions to:

access, from a storage medium, an executable graphical model, the executable graphical model including a plurality of model parts, the plurality of model parts operating in analysis frameworks, where the analysis frameworks rely upon different dedicated algorithms to derive solutions for the plurality of model parts during processing, the analysis frameworks including at least two of a time-based block diagram analysis framework, a non-causal equation system analysis framework, a multi-body analysis framework, a reactive control system analysis framework, and a state transition analysis framework;
group at least some of the plurality of model parts together to form model portions such that each model portion operates in one of the analysis frameworks,
identify two of the model portions of the executable graphical model connected to each other by a graphical element of the executable graphical model, where the graphical element represents an interface between the two model portions and includes at least one of a port, a connection, or a block;
determine, by a processor coupled to the storage medium, that the two model portions each operate in a first analysis framework of the analysis frameworks;
determine, by the processor, that the graphical element operates in a second analysis framework of the analysis frameworks, where the second analysis framework is different from the first analysis framework;
process, by the processor, the executable graphical model to remove the graphical element that connects the two model portions; and
combine the two model portions.

2. The non-transitory, computer-readable storage medium of claim 1 further comprising instructions to:
add a new connection between the two model portions.

3. The non-transitory, computer-readable storage medium of claim 2, wherein the new connection added between the two model portions is a direct connection.

4. The non-transitory, computer-readable storage medium of claim 1 further comprising instructions to:
maintain the executable graphical model, following the combining of the two model portions, as an internal configuration.

5. The non-transitory, computer-readable storage medium of claim 1 further comprising instructions to:
generate a modified executable graphical model, the graphical element absent from the modified executable graphical model; and
present a visual representation of the modified executable graphical model.

6. The non-transitory, computer-readable storage medium of claim 1 wherein the graphical element represents a boundary between the two model portions.

7. The non-transitory, computer-readable storage medium of claim 1 wherein
the model portions of the executable graphical model have types, and
the types of model portions include one or more of a multi-body type, a control system type, a state diagram type, an electrical system type, a hydraulic system type, and a rotating machine type.

8. The non-transitory, computer-readable storage medium of claim 1 wherein the graphical element is a demarcating block or a polymorph block.

9. The non-transitory, computer-readable storage medium of claim 1 wherein the graphical element provides a direct connection between the two model portions.

10. The non-transitory, computer-readable storage medium of claim 1 wherein the combining the two model portions includes merging the two model portions into a single model portion.

11. A non-transitory, computer-readable storage medium with an executable program stored thereon, the executable program comprising instructions to:
access, from a storage medium, an executable graphical model, the executable graphical model including a plurality of model parts, the plurality of model parts operating in analysis frameworks, where the analysis frameworks rely upon different dedicated algorithms to derive solutions for the plurality of model parts during processing, the analysis frameworks including at least two different analysis frameworks of a time-based block diagram analysis framework, a non-causal equation system analysis framework, a multi-body analysis framework, a reactive control system analysis framework, and a state transition analysis framework;
group at least some of the plurality of model parts together to form model portions such that each model portion operates in one of the analysis frameworks;
identify two of the model portions of the executable graphical model connected to each other by a graphical element of the executable graphical model, where the graphical element represents an interface between the two model portions and includes at least one block;
determine that the two model portions operate in a same analysis framework of the analysis frameworks;
identify the graphical element as a polymorph block, the polymorph block supporting multiple, alternative behaviors; and
interpret, by a processor coupled to the storage medium, the polymorph block to have a selected one of the multiple, alternative behaviors, where the behavior selected for the polymorph block is in the same analysis framework as the two model portions.

12. A non-transitory, computer-readable storage medium with an executable program stored thereon, the executable program comprising instructions to:
access, from a storage medium, an executable graphical model, the executable graphical model including a plurality of model parts, the plurality of model parts operating in analysis frameworks, where the analysis frameworks rely upon different dedicated algorithms to derive solutions for the plurality of model parts during processing, the analysis frameworks including at least two different analysis frameworks of a time-based block diagram analysis framework, a non-causal equation system analysis framework, a multi-body analysis framework, a reactive control system analysis framework, and a state transition analysis framework;
group at least some of the plurality of model parts together to form model portions such that each model portion operates in one of the analysis frameworks;
identify two of the model portions of the executable graphical model connected to each other by a polymorph block of the executable graphical model, the polymorph block supporting multiple, alternative behaviors;
determine, by a processor coupled to the storage medium, that the two model portions operate in a same analysis framework of the analysis frameworks; and
translate, by the processor, the polymorph block to a selected behavior that fits the same analysis framework as the two model portions.

13. The non-transitory, computer-readable storage medium of claim 12 wherein the identifying the two model portions includes finding a maximum partition of each of the two model portions that operate in the same analysis framework.

14. The non-transitory, computer-readable storage medium of claim 12 wherein the selected behavior of the polymorph block includes operating on one or more data values.

15. A non-transitory, computer-readable storage medium with an executable program stored thereon, the executable program comprising instructions to:
    access, from a storage medium, an executable graphical model, the executable graphical model having a plurality of subsystems including:
        a first subsystem having a first model portion operating in a first analysis framework of analysis frameworks that rely upon different dedicated algorithms to derive solutions for a plurality of model parts, the analysis frameworks including at least two of a time-based block diagram analysis framework, a non-causal equation system analysis framework, a multi-body analysis framework, a reactive control system analysis framework, or a state transition analysis framework, and
        a second subsystem having a second model portion operating in the first analysis framework;
    determine that an interface between the first subsystem and the second subsystem operates under a second analysis framework, of the analysis frameworks, that is different from the first analysis framework, the interface including at least one of a port, a connection, or a block of the executable graphical model;
    change, by a processor coupled to the storage medium, the interface between the first subsystem and the second subsystem to operate under the first analysis framework; and
    process, by the processor, the first model portion of the first subsystem and the second model portion of the second subsystem as one combined model portion.

16. The non-transitory, computer-readable storage medium of claim 15 wherein the first model portion of the first subsystem and the second model portion of the second subsystem are processed into one set of sorted equations.

17. The non-transitory, computer-readable storage medium of claim 15 wherein the changing the interface includes modifying a first port on the first subsystem and a second port on the second subsystem to operate in the first analysis framework.

18. The non-transitory, computer-readable storage medium of claim 15 wherein
    the first subsystem includes a third model portion operating in the second analysis framework, and
    the second subsystem includes a fourth model portion operating in the second analysis framework.

19. A non-transitory, computer-readable storage medium with an executable program stored thereon, the executable program comprising instructions to:
    access, from a storage medium, an executable graphical model, the executable graphical model including a plurality of model parts, the plurality of model parts operating in analysis frameworks, where the analysis frameworks rely upon different dedicated algorithms to derive solutions for the plurality of model parts, the analysis frameworks including at least two of a time-based block diagram analysis framework, a non-causal equation system analysis framework, a multi-body analysis framework, a reactive control system analysis framework, and a state transition analysis framework;
    group at least some of the plurality of model parts together to form model portions such that each model portion operates in one of the analysis frameworks, where
        a first model portion operates in a first analysis framework of the analysis frameworks, and
        a second model portion operates in a second analysis framework, of the analysis frameworks, that is different from the first analysis framework;
    identify a first interface between the first model portion and the second model portion, where the first interface includes at least one of a port, a connection, or a block of the executable graphical model; and
    transform, by a processor coupled to the storage medium, the first interface to connect the first model portion operating in the first analysis framework and the second model portion operating in the second analysis framework.

20. The non-transitory, computer readable-storage medium of claim 19 further comprising instructions to:
    execute the executable graphical model including the first model portion and the second model portion utilizing the first interface.

21. The non-transitory, computer-readable storage medium of claim 19 wherein the first interface passes at least one variable either from the first analysis framework to the second analysis framework or from the second analysis framework to the first analysis framework.

22. The non-transitory, computer-readable storage medium of claim 19 wherein the executable graphical model includes a third model portion that operates in a third analysis framework that is different from the first and second analysis frameworks, the executable program further comprising instructions to:
    identify a second interface between the first model portion and the third model portion; and
    transform, by the processor, the second interface to connect the first model portion and the third model portion operating in different analysis frameworks.

23. The non-transitory, computer-readable storage medium of claim 22 wherein the first interfaces passes at least one variable from the first analysis framework to the second analysis framework and the at least one variable is passed from the first analysis framework to the third analysis framework.

24. An apparatus comprising:
    a storage medium storing an executable graphical model, the executable graphical model including a plurality of model parts, the plurality of model parts operating in analysis frameworks, where the analysis frameworks rely upon different dedicated algorithms to derive solutions for the plurality of model parts during processing, the analysis frameworks including at least two of a time-based block diagram analysis framework, a non-causal equation system analysis framework, a multi-body analysis framework, a reactive control system analysis framework, and a state transition analysis framework; and
    a processor coupled to the storage medium, the processor configured to:
        group at least some of the plurality of model parts together to form model portions such that each model portion operates in one of the analysis frameworks,
        identify two of the model portions of the executable graphical model connected to each other by a graphical element of the executable graphical model, where the graphical element represents an interface between the two model portions and includes at least one of a port, a connection, or a block;
        determine that the two model portions each operate in a first analysis framework of the analysis frameworks;

determine that the graphical element operates in a second analysis framework of the analysis frameworks, where the second analysis framework is different from the first analysis framework;

process the executable graphical model to remove the graphical element that connects the two model portions; and combine the two model portions.

25. The apparatus of claim 24 wherein the processor is further configured to:

add a new connection between the two model portions.

26. The apparatus of claim 24 wherein the processor is further configured to:

generate a modified executable graphical model, the graphical element absent from the modified executable graphical model; and present a visual representation of the modified executable graphical model.

27. The apparatus of claim 24 wherein the model portions of the executable graphical model have types, and the types of model portions include one or more of a multi-body type, a control system type, a state diagram type, an electrical system type, a hydraulic system type, and a rotating machine type.

28. The apparatus of claim 24 wherein the graphical element is a demarcating block or a polymorph block.

29. The apparatus of claim 24 wherein the combining the two model portions includes merging the two model portions into a single model portion.

30. An apparatus comprising:

a storage medium storing an executable graphical model, the executable graphical model including a plurality of model parts, the plurality of model parts operating in analysis frameworks, where the analysis frameworks rely upon different dedicated algorithms to derive solutions for the plurality of model parts, the analysis frameworks including at least two of a time-based block diagram analysis framework, a non-causal equation system analysis framework, a multi-body analysis framework, a reactive control system analysis framework, and a state transition analysis framework; and a processor coupled to the storage medium, the processor configured to:

group at least some of the plurality of model parts together to form model portions such that each model portion operates in one of the analysis frameworks, where a first model portion operates in a first analysis framework of the analysis frameworks, and a second model portion operates in a second analysis framework, of the analysis frameworks, that is different from the first analysis framework;

identify a first interface between the first and second model portions, where the first interface includes at least one of a port, a connection, or a block of the executable graphical model; and transform the first interface to connect the first model portion operating in the first analysis framework and the second model portion operating in the second analysis framework.

31. The apparatus of claim 30 wherein the executable graphical model includes a third model portion that operates in a third analysis framework that is different from the first analysis framework and the second analysis framework, the processor further configured to:

identify a second interface between the first model portion and the third model portion; and transform, by the processor, the second interface to connect the first model portion operating in the first analysis framework and the third model portion operating in the third analysis framework.

32. A method comprising:

accessing, from a storage medium, an executable graphical model, the executable graphical model including a plurality of model parts, the plurality of model parts operating in analysis frameworks, where the analysis frameworks rely upon different dedicated algorithms to derive solutions for the plurality of model parts during processing, the analysis frameworks including at least two of a time-based block diagram analysis framework, a non-causal equation system analysis framework, a multi-body analysis framework, a reactive control system analysis framework, and a state transition analysis framework;

grouping at least some of the plurality of model parts together to form model portions such that each model portion operates in one of the analysis frameworks;

identifying two of the model portions of the executable graphical model connected to each other by a graphical element of the executable model, where the graphical element represents an interface between the two model portions and includes at least one of a port, a connection, or a block;

determining, by a processor coupled to the storage medium, that the two model portions each operate in a first analysis framework of the analysis frameworks;

determining, by the processor, that the graphical element operates in a second analysis framework of the analysis frameworks, where the second analysis framework is different from the first analysis framework;

processing, by the processor, the executable graphical model to remove the graphical element that connects the two model portions; and combining the two model portions.

33. The method claim 32 further comprising:

adding a new connection between the two model portions.

34. The method of claim 32 further comprising:

generating a modified executable graphical model, the graphical element absent from the modified executable graphical model; and presenting a visual representation of the modified executable graphical model.

35. The method of claim 32 wherein the model portions of the executable graphical model have types, and the types of model portions include one or more of a multi-body type, a control system type, a state diagram type, an electrical system type, a hydraulic system type, and a rotating machine type.

36. The method of claim 32 wherein the graphical element is a demarcating block or a polymorph block.

37. The method of claim 32 wherein the combining the two model portions includes merging the two model portions into a single model portion.

38. A method comprising:

accessing, from a storage medium, an executable graphical model, the executable graphical model including a plurality of model parts, the plurality of model parts operating in analysis frameworks, where the analysis frameworks rely upon different dedicated algorithms to derive solutions for the plurality of model parts, the analysis frameworks including at least two of a time-based block diagram analysis framework, a non-causal equation system analysis framework, a multi-body analysis framework, a reactive control system analysis framework, and a state transition analysis framework;

grouping at least some of the model parts together to form model portions such that each model portion operates in one of the analysis frameworks, the model portions including:
- a first model portion operating in a first analysis framework of the analysis frameworks, and
- a second model portion operating in a second analysis framework, of the analysis frameworks, that is different from the first analysis framework;

identifying a first interface between the first model portion and the second model portion; and transforming, by a processor coupled to the storage medium, the first interface to connect the first model portion operating in the first analysis framework and the second model portion operating in the second analysis framework.

39. The method of claim 38 wherein the executable graphical model includes a third model portion that operates in a third analysis framework that is different from the first analysis framework and the second analysis framework, the method further comprising:

identifying a second interface between the first model portion and the third model portion; and transforming, by the processor, the second interface to connect the first model portion operating in the first analysis framework and the third model portion operating in the third analysis framework.

* * * * *

UNITED STATES PATENT AND TRADEMARK OFFICE
CERTIFICATE OF CORRECTION

| | |
|---|---|
| PATENT NO. | : 10,817,628 B1 |
| APPLICATION NO. | : 13/180365 |
| DATED | : October 27, 2020 |
| INVENTOR(S) | : Pieter J. Mosterman et al. |

It is certified that error appears in the above-identified patent and that said Letters Patent is hereby corrected as shown below:

In the Specification

Column 11, Line 62:
"prisimatic mode 148, and a second body model 50. The"
Replace with:
"prisimatic model 48, and a second body model 50. The"

Column 12, Line 30:
"38 and the second body mode 150 existed, as shown in FIG."
Replace with:
"38 and the second body model 50 existed, as shown in FIG."

Column 17, Line 12:
"a', for receiving the COG information from the slider sub-"
Replace with:
"'R', for receiving the COG information from the slider sub-"

Column 17, Line 15:
"labeled T', that provides the computed position of the"
Replace with:
"labeled 'P', that provides the computed position of the"

Signed and Sealed this
Twenty-eighth Day of May, 2024

Katherine Kelly Vidal
*Director of the United States Patent and Trademark Office*